F. A. REECE.
BUTTONHOLE SEWING MACHINE.
APPLICATION FILED DEC. 18, 1915. RENEWED APR. 17, 1920.

1,343,278.

Patented June 15, 1920.
8 SHEETS—SHEET 1.

Inventor.
Franklin A. Reece.
by Heard Smith & Jennan
Attys

F. A. REECE.
BUTTONHOLE SEWING MACHINE.
APPLICATION FILED DEC. 18, 1915. RENEWED APR. 17, 1920.

1,343,278.

Patented June 15, 1920.
8 SHEETS—SHEET 3.

Inventor.
Franklin A. Reece,
by Heard Smith & Tennant.
Attys

F. A. REECE.
BUTTONHOLE SEWING MACHINE.
APPLICATION FILED DEC. 18, 1915. RENEWED APR. 17, 1920.

1,343,278.

Patented June 15, 1920.
8 SHEETS—SHEET 4.

Inventor.
Franklin A. Reece,
by Heard Smith & Tennant.
Attys.

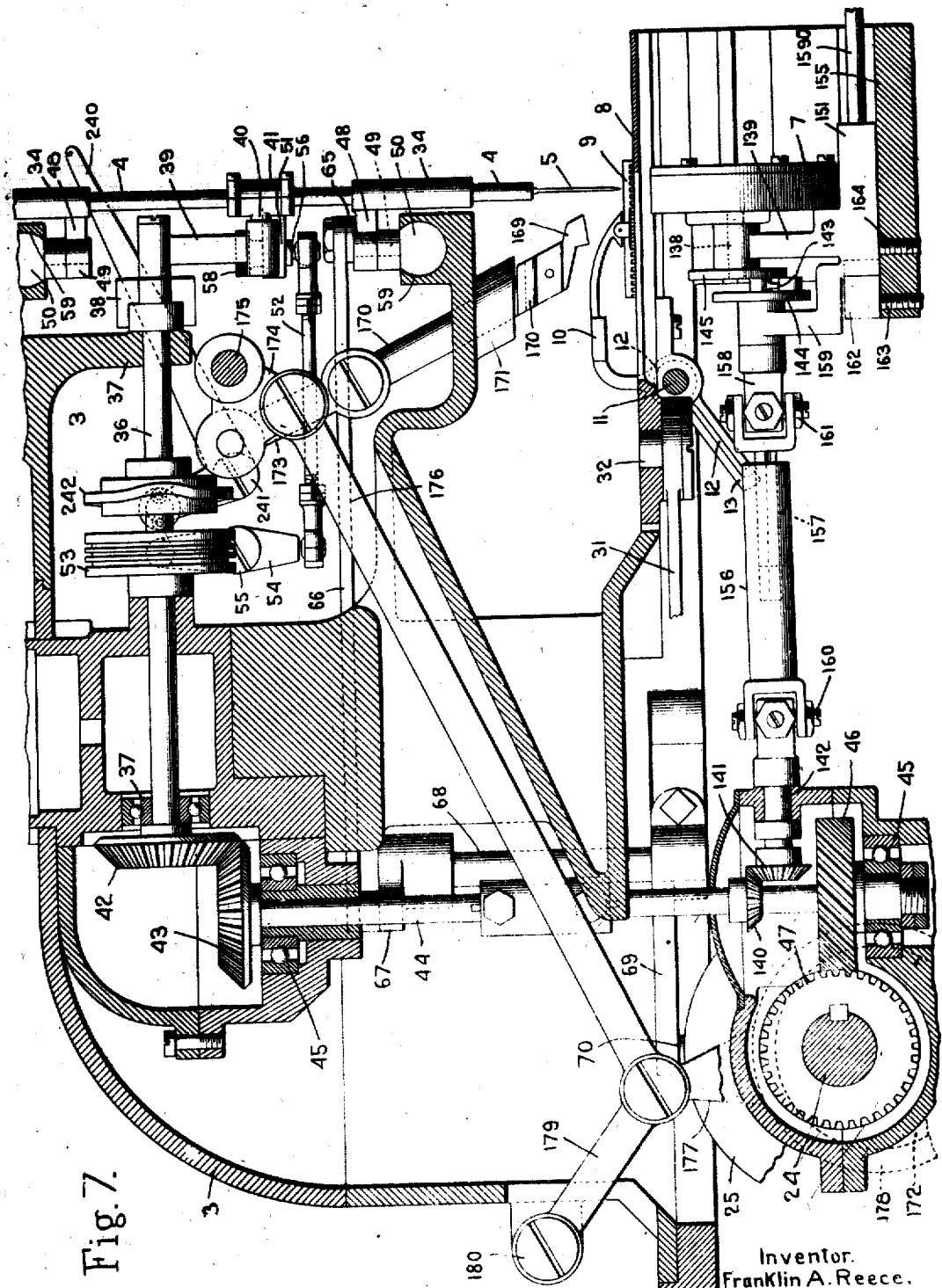

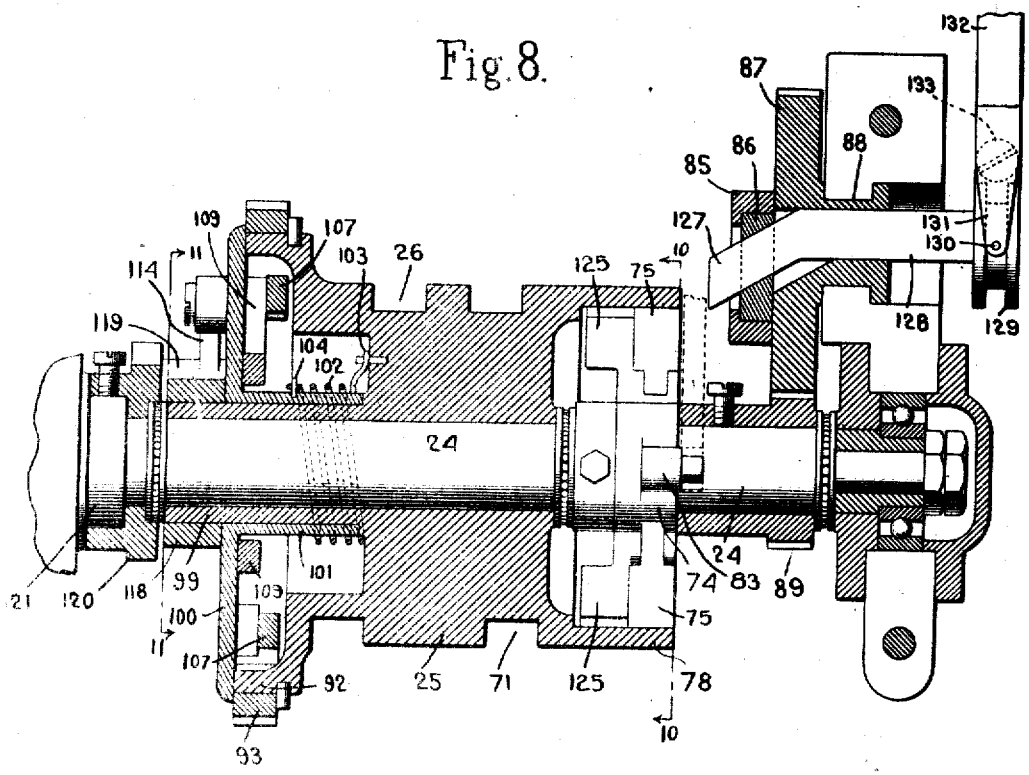

F. A. REECE.
BUTTONHOLE SEWING MACHINE.
APPLICATION FILED DEC. 18, 1915. RENEWED APR. 17, 1920.

1,343,278.

Patented June 15, 1920.
8 SHEETS—SHEET 7.

Inventor
Franklin A. Reece,
by Heard Smith & Tennant
Attys.

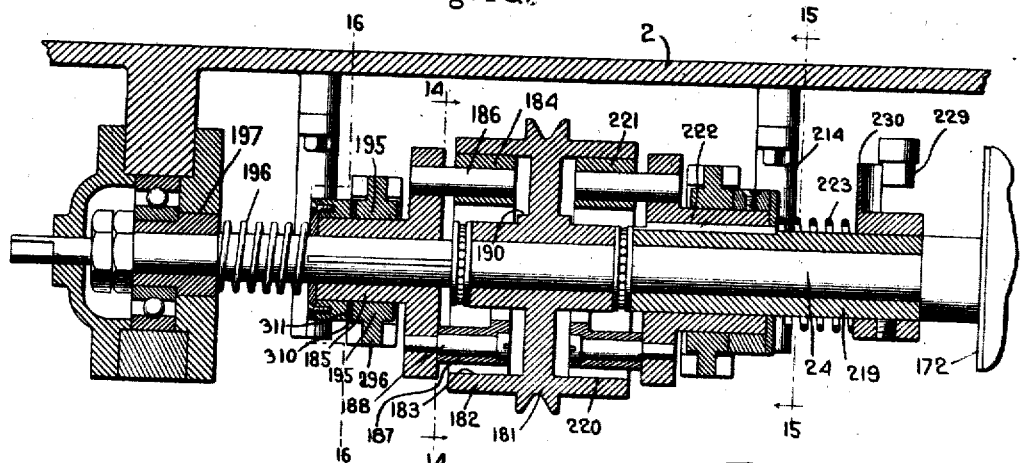

UNITED STATES PATENT OFFICE.

FRANKLIN A. REECE, OF CHESTNUT HILL, MASSACHUSETTS, ASSIGNOR TO T**
REECE BUTTON HOLE MACHINE COMPANY, OF BOSTON, MASSACHUSETTS A
CORPORATION OF MAINE.

BUTTONHOLE-SEWING MACHINE.

1,343,278.　　　　　　Specification of Letters Patent.　Patented June 15, 1920.

Application filed December 18, 1915, Serial No. 67,683.　Renewed April 17, 1920.　Serial No. 374,748

*To all whom it may concern:*

Be it known that I, FRANKLIN A. REECE, a citizen of the United States, residing at Chestnut Hill, county of Middlesex, State of Massachusetts, have invented an Improvement in Buttonhole-Sewing Machines, of which the following description, in connection with the accompanying drawing, is a specification, like characters on the drawing representing like parts.

This invention relates to buttonhole sewing machines and has for its principal object to provide a sewing machine designed for high speed operation. In securing this end I have aimed to reduce to a minimum the number of moving parts and the extent of their movements and have also aimed to provide mechanism for operating the parts which will permit of high speed operation with a minimum jar and vibration.

My improved machine comprises stitch-forming mechanism including upper thread-handling mechanism and lower thread-handling mechanism which coöperate to form a lock stitch, and work-holding means constructed to feed the work back and forth as the over-seam stitches are formed at the edge of the buttonhole. The stitch-forming mechanism is constructed so that the upper thread-handling mechanism is in the form of a reciprocating needle, and the lower thread-handling mechanism is in the form of a rotary shuttle. The upper stitch-forming mechanism is so constructed and operated that the needle has a lateral as well as a reciprocating movement, the lateral movement operating to cause the needle to make thrusts alternately at the edge of the buttonhole and back from the edge of the buttonhole, and also operating to give the needle an added lateral movement at the ends of the buttonhole thereby to form barring stitches. A buttonhole-cutting mechanism is provided for cutting the buttonhole which is constructed to act on the cloth while it is held in the work clamp in stitching position, thus avoiding the necessity of any movement of the work clamp to carry the work from stitching position to buttonhole-cutting position and vice versa. This elimination of any movement of the work from the stitching position to the buttonhole-cutting position or vice versa adds to the speed of operation.

In order to give an understanding of my invention I have illustrated in the drawings a selected embodiment thereof which will now be described, after which the novel features will be pointed out in the appended claims.

Figure 1 of the drawings is a side view of a sewing machine embodying my invention;

Fig. 6 is a detail view of the work clamp and its operating mechanism;

Fig. 7 is an enlarged sectional view on substantially the line 7—7, Fig. 3;

Fig. 8 is a sectional view through the mechanism for operating the feed cam;

Fig. 9 is a detail view of the means for adjusting the length of the stitch;

Fig. 13 is a sectional view through the clutches for operating the driving shaft and the buttonhole-cutting mechanism;

Fig. 14 is a section on the line 14—14, Fig. 13;

Fig. 15 is a section on the line 15—15, Fig. 13;

Fig. 16 is a section on the line 16—16, Fig. 13;

Fig. 18 is an enlarged view of a buttonhole showing the manner in which the edge and barring stitches are formed.

Fig. 19 is a fragmentary detail view of the means for controlling the operation of the buttonhole cutter;

Figs. 20 and 21 are diagram views showing the manner in which the needle is operated.

Figure 1:
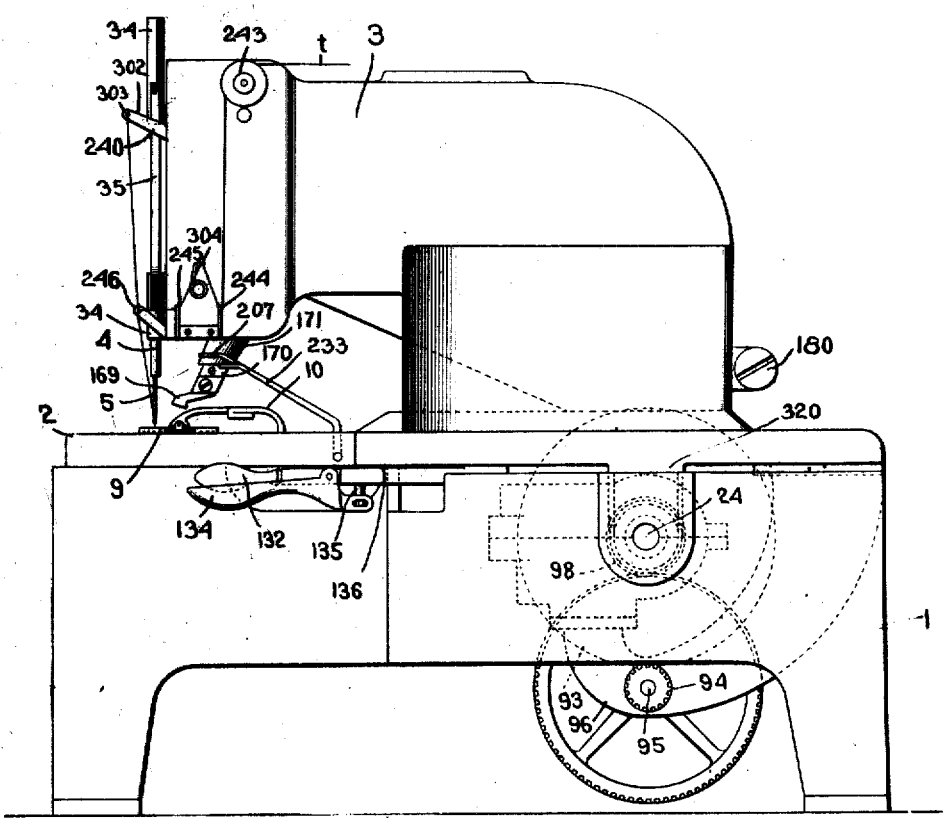

1 indicates a base frame on which is supported a base plate 2 that carries the work-clamping mechanism and from which rises the overhanging arm 3 carrying the upper thread-handling mechanism, as usual in sewing machines of this type. This upper thread-handling mechanism is in the form of the usual vertically-reciprocating needle bar 4 carrying an eye-pointed needle 5. The under thread-handling mechanism is in the form of a rotary element 6 which rotates in a track formed in a casing 7 situated beneath the bed plate 2 and by its rotation casts a loop of needle thread about a bobbin 146 carrying the under thread as usual in some types of buttonhole sewing machines. For convenience I will hereinafter refer to the rotary element 6 as a shuttle. The devices for operating the upper and under thread-handling mechanisms will be presently described.

The work is held in position on a clamp plate 8 by means of a work clamp 9, the latter being shown as pivotally connected to an arm 10 that in turn is mounted on a rock-shaft 11 journaled beneath the clamp plate 8. This work clamp 9 is provided with an opening therein through which the needle 5 operates in the formation of the stitch. The work clamp 9 is yieldingly held in operative position against the work, and means are provided for manually raising it to release the work. For thus yieldingly holding the clamp against the work I provide a spring 12 which encircles the rock shaft 11 and has one end fastened to an arm 13 extending from the rock shaft and the other end engaging a fixed support or bearing as 14. The spring is so wound about the shaft that the normal tendency thereof is to throw the work clamp downwardly toward the clamp plate 8. The shaft 11 has fast thereto an arm 15 which rests on and engages a roll 16 carried by an arm 17 fast on a second rock shaft 18 that is journaled in the base frame 1. Said shaft 18 has a crank arm 19 extending therefrom which may be provided with a handle 20 by which it may be turned, and may also have a link 21 connected thereto which leads to a treadle, see Fig. 6. By depressing the crank arm 19, the roll 16 on the arm 17 engages the arm 15 thereby raising the work clamp and releasing the work against the action of the spring 12.

In the operation of sewing the buttonhole, the needle not only reciprocates to effect the formation of the stitches, but it also vibrates so that the needle thrusts are alternately made at the edge of the buttonhole and at a distance back from the edge thereof, as shown in Fig. 18. In said figure, the needle thrusts at the edge of the buttonhole are indicated at 22, and those at a distance back from the buttonhole at 23. During this sewing operation the work is fed so that the stitches are formed along the length of the buttonhole, and when the stitches have been formed on one side of the buttonhole, then the position of the needle is shifted laterally and the direction of the feeding is changed so that the stitches are formed on the opposite side of the buttonhole. At each end of the buttonhole barring stitches will be formed by mechanism which will be presently described.

The work clamp has simply a to-and-fro movement to effect the feeding of the work as the edge stitches are formed, and the location of the stitches on one or the other side of the buttonhole is determined by the lateral shifting movement of the needle. The clamp plate 8 and work clamp 9 are mounted on the base plate 2 for longitudinal movement only, said clamp plate being mounted to slide in suitable guides. The feeding movement of the work clamp is derived from a feed cam mounted on the driving shaft 24 which is herein shown as situated beneath the bed plate 2 and as extending at right angles to the direction of the feeding movement. All of the operative parts of the machine are actuated from this driving shaft, as will be presently described. The feed cam is herein shown as a cam element 25 which is loosely mounted on the driving shaft 24 and is provided with a feed cam groove 26 in which operates a roll or projection 27 carried by a lever 28 pivoted to the frame at 29. This lever 28 has an arm 30 to which is connected a link 31 that in turn is pivotally connected to the clamp plate 8 at 32, see Figs. 2 and 7. The lever 28 is an elbow-lever and by means of this construction the movement given to the lever by the cam groove 26 will be properly transferred to the clamp plate 8 so as to give it a movement at right angles to the direction of the shaft. The feed cam groove 26 gives the lever 28 a fixed throw and the length of the buttonhole will, of course, be determined by the extent of movement which is given to the clamp plate 8. I have provided herein means whereby this may be varied so that a longer or shorter buttonhole can be formed. This is accomplished by providing the arm 30 of the lever 28 with a slot 33 and providing means whereby the end of the link 31 can be adjusted in said slot 33 nearer to or farther from the pivot 29 of the lever 28. An adjustment of the link 31 to the left, Fig. 2 will produce a longer buttonhole, while an adjustment to the right will produce a shorter buttonhole, as will be obvious. Inasmuch as the work clamp and clamp plate have only a longitudinal movement, the mechanism for operating them can be made comparatively simple which is conducive to high speed operation.

As stated above, the needle 5 and needle bar 4 are mounted so that they have a lateral vibratory movement as well as the necessary vertical reciprocating movement. The needle bar is mounted for reciprocation in bearings 34 formed in a vibratable frame or carrier 35, and said needle bar is given its vertical reciprocating movement from a shaft 36 that is journaled in bearings 37 formed in the overhanging arm 3. This shaft 36 is provided at its end with a crank disk 38 which is connected by a link or connecting rod 39 with a pin 40 extending from a block 41 that is clamped to the needle bar 4 so that rotation of the shaft 36 will reciprocate the needle in its bearings 34. This shaft 36 is driven from the driving shaft 24, and while any suitable driving connection might be employed, I consider that herein shown as simple and practicable. The shaft 36 is provided with a bevel gear 42 which is geared to a bevel gear 43 mounted on a vertically-extending shaft 44 that is journaled in suitable bearings 45 and carries at its lower end a spiral gear 46 that meshes with and is driven by a gear 47 fast on the shaft 24.

Figure 3:
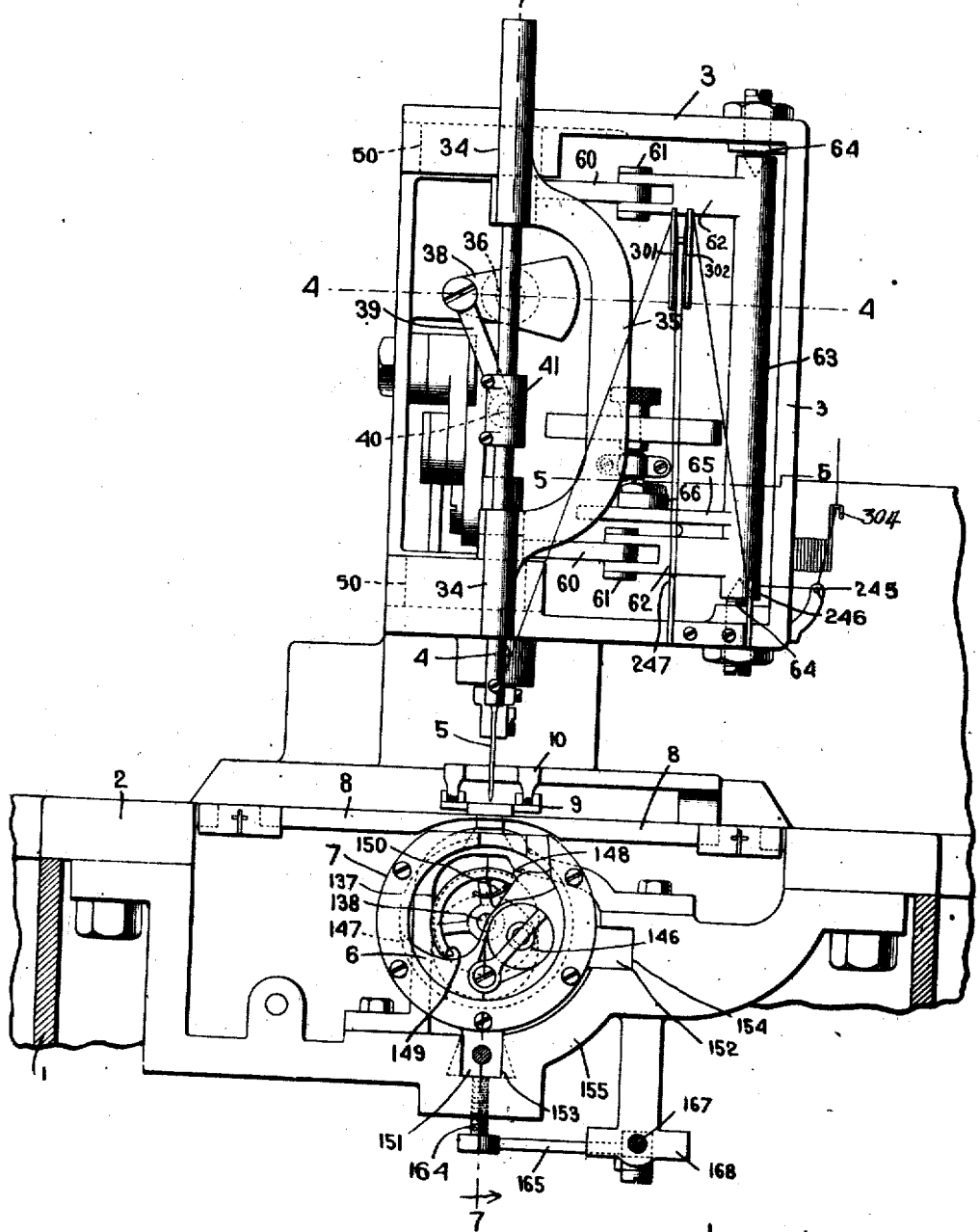
Fig. 3 is a front elevation with some parts shown in section to better illustrate the mechanism.
Figure 4:
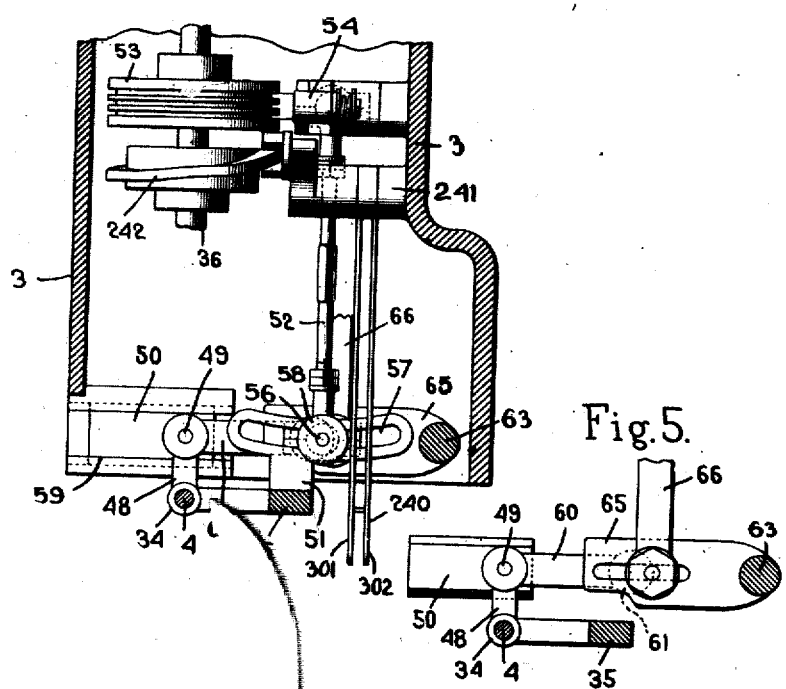
Fig. 4 is a section on the line 4—4, Fig. 3.
Figure 5:
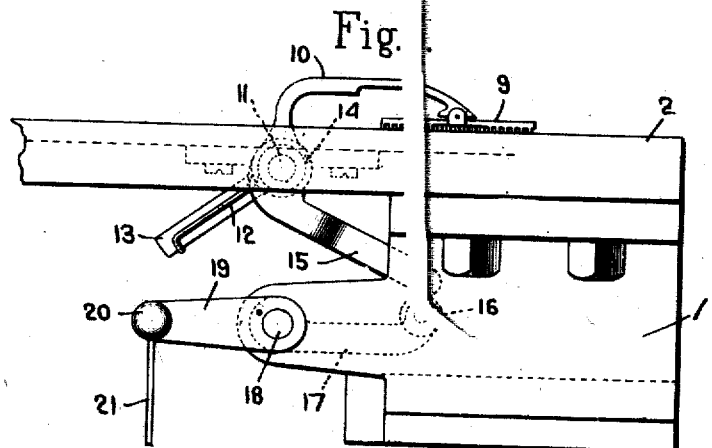
Fig. 5 is a section on the line 5—5, Fig. 3.

As stated above, the frame 35 is mounted for lateral movement and means are provided whereby said frame has one lateral movement to provide for causing the needle to make the alternate thrust 22, 23 at each side of the buttonhole, and it has another lateral movement which results in the formation of the barring stitches. The first lateral movement which results in the formation of the edge stitches is secured by mounting the frame 35 to swing about a center, and the second lateral movement for forming the barring stitches is secured by giving said frame not only its lateral swinging movement, but also a bodily lateral movement which, combined with the swinging movement, produces the barring stitches. This frame 35 is provided at its upper and lower ends with laterally-extending arms 48 which are pivotally connected at 49 to sliding blocks 50, see Figs. 3, 4 and 7. The lateral vibratory movement of the needle bar by which the edge stitches are formed is secured by swinging the frame 35 about the pivots 49 as centers. This swinging movement is derived from a switch cam 53 on the shaft 36, said switch cam operating a lever 54 pivoted to the frame at 55 and connected at its lower end to one end of a link 52, the other end of which link is pivotally connected to a stud 56 mounted in a projection 51 extending laterally from the carrier 35. The switch cam 53 is of the usual type adapted to give the link 52 a quick movement in one direction and then to hold said link from movement during one rotation of the shaft 36 and then to return said link to its initial position and hold it there during the second rotation of the shaft. By this means the frame 35 is given its vibratory movement so that at one thrust the needle will enter the center of the buttonhole and at the next thrust will pass through the goods at a distance back from the buttonhole.

The construction herein shown is arranged so that the length of the depth stitch can be varied, and this is herein provided for by making the projection 51 with the slot 57 in which the stud 56 is adjustably secured, said stud being clamped in adjusted position by the clamping nut 58. The adjustment of the stud 56 toward the right, Fig. 4, will produce a shorter stitch, while its adjustment to the left, will produce a longer stitch.

The long barring stitches at the end of the buttonhole are produced by shifting the carrier 35 bodily in a lateral direction, while at the same time swinging it about the pivots 49, the combined movements operating to give the needle a sufficiently long lateral movement to provide for the barring stitches. My sewing machine may be so arranged that the barring stitches will consist entirely of elongated stitches, or so that the barring stitches will be partly long stitches and partly short stitches. Referring to Fig. 18 I have shown an arrangement of barring stitches, part of which are long stitches and part of which are short stitches. At the end of the stitching on the side of the buttonhole, the needle makes the thrust at the point $a$ and at the next thrust it is shifted over so as to enter the goods at the point $b$, thus making a long stitch. At the third thrust it will enter the goods at the point $c$, thus making a short stitch, and will then enter the goods at the point $d$, and then at the point $a$, thus making a series of short stitches, after which it is given a sufficient movement to enter at the point $b$ again, thus making a long stitch, and then at the point $c$, thus making a short stitch.

The bodily movement of the carrier 35 necessary to produce the longer of the barring stitches is provided for by making the blocks 50 to which the carrier 35 is pivoted capable of sliding movement in the overhanging arm. Said overhanging arm is shown as provided with ways 59 extending transversely of the arm 3 and in which the blocks 50 are mounted, said ways preferably being undercut at the sides, as shown in Fig. 7, so as to prevent the blocks from being removed in a vertical direction. When the blocks 50 are stationary, then the vibrating movement of the needle bar 4 will be that which results from the operation of the switch cam 53 only, but if the blocks 50 have a sliding movement simultaneously with the swinging movement of the carrier 35, then the needle bar will be given an added lateral movement capable of producing the longer barring stitches. This sliding movement of the blocks 50 for producing the long barring stitches is derived from a barring cam mounted on the shaft 24.

Each block 50 has pivotally secured thereto a link 60 which is pivoted at 61 to an arm 62 fast on a vertically-extending rock shaft 63 which is mounted on suitable bearings 64 carried by the overhanging arm 3. With this construction an oscillation of the rock shaft 63 will operate through the arms 62 and 60 to slide the blocks 50 back and forth in their guideways. The rock shaft 63 has an arm or projection 65 extending therefrom to which is pivotally connected one end of a link 66, the other end of said link being connected to an arm 67 on the upper end of a vertically-extending rock shaft 68 that is journaled in suitable bearings in the frame. This rock shaft 68 carries at its lower end an arm 69 provided with a roll 70 that operates in a cam groove 71 formed in the cam element 25.

Figure 17:
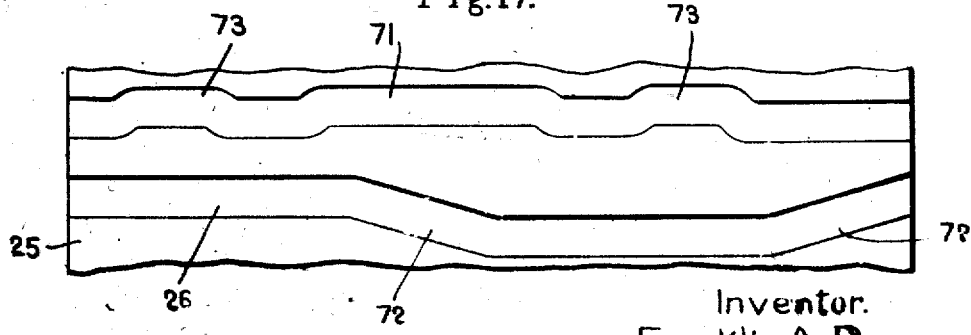
Fig. 17 is a view showing the feed and barring cams developed and arranged in operative relation.

The barring cam groove 71 and the feed cam groove 26 are both formed in the cam element 25. These grooves are so designed relative to each other that the rock shaft 63 will be held stationary while the work is being fed by the feed cam groove 26, and the work will be held stationary by the feed cam while the rock shaft 63 is vibrating to effect the barring. The relation between these cams is shown in diagram in Fig. 17 where the cams are developed side by side. The feeding of the work is effected by the inclined portion 72 of the feed cam groove 26, and the barring is effected by the portion 73 of the barring cam groove 71, and these operative portions 72 and 73 are so arranged relative to each other as to produce the desired result. The barring cam groove 71 is also arranged to control the position of the frame 35 so as to provide for shifting the position of the needle from one side of the buttonhole to the other. In other words, the stitches are formed down one side of the buttonhole and then the barring stitches at the end of the buttonhole are formed and the cam groove 71 then operates to position the blocks 50 so that upon the reversal of the feeding movement the needle is in position to operate on the opposite side of the buttonhole, and when the overstitching on the opposite side of the buttonhole has been completed, the barring cam then acts to effect the barring on the end of the buttonhole.

In the embodiment of the invention herein illustrated the barring cam groove 71 and the means for operating the cam element 25 have such a coöperative relation with the stitch-forming mechanism that the needle will make two thrusts for each shifting movement of the blocks 50. The switch cam 53, however, operates to give the needle bar a lateral vibration at each thrust of the needle. The lateral movement which is given to the needle bar by the barring cam is slightly greater than the lateral movement which is given by the switch cam 53. The difference between the lateral or vibratory movements given to the needle by the switch cam 53 and by the barring cam is illustrated diagrammatically in Figs. 20 and 21. In Fig. 20 I have illustrated at $a'$, $a^2$, $a^3$, $a^4$, $a^5$, etc., the relative positions of the needle at successive thrusts thereof due solely to the operation of the switch cam 53, and in Fig. 21 I have illustrated at $a'$, $a^2$, $a^3$, $a^4$, $a^5$, etc., the relative positions of the needle at successive thrusts due solely to the operation of the barring cam. It will be noted that if the barring cam alone were controlling the position of the needle, the latter would have two thrusts for each lateral movement thereof, while when the switch cam alone controls the movement of the needle, it will have a lateral movement at each thrust. During the barring operation the position of the needle is controlled by the combined action of the barring cam and the switch cam, and assuming that at the beginning of the barring operation the needle makes the first thrust at the point $a'$, then the succeeding stitches will be formed as follows:

When the needle is raised after making its first thrust, the switch cam 53 operates to move the needle laterally to the right, and at the same time the barring cam acts to give the needle a further lateral movement by moving the blocks 50. The result will be that the needle bar will have a long lateral movement equal to the sum of the movements given in the same direction by the switch cam and the barring cam. This makes the long stitch. At the next thrust of the needle the barring cam is inactive but the switch cam 53 moves the needle to the left, thus producing a short stitch, and at the next thrust the barring cam tends to move the needle to the left while the switch cam would tend to move the needle to the right, but as the movement given by the barring cam is slightly longer than that given by the switch cam, the result of the two movements will be a small further movement to the left, thus producing a second short stitch. At the next thrust of the needle the barring cam has no effect upon the needle, but the switch cam moves it to the left again which will result in a third short stitch, and at the next thrust both the switch cam and the barring cam tend to move the needle to the right, thus making another long stitch. At the next thrust of the needle the barring cam gives the needle no lateral movement, but the switch cam moves it to the left again, thus making a short stitch and so on. This produces the barring stitch illustrated in Fig. 18. Looking at the upper end of Fig. 18, the needle will make the thrust at the point $a$ at the end of the stitching operation by which the edge stitches are formed, and when the needle is raised from this thrust both the barring cam and the switch cam come into action to move the needle over so that at the next thrust it will enter the goods at the point $b$, thus making the long stitch. At the next thrust the barring cam has no effect on the needle, but the switch cam moves the needle to the left, thus causing it to enter the goods at the point $c$. At the next thrust, the barring cam tends to move the needle to the left and the switch cam moves it to the right, but as the barring cam gives the needle a greater movement than the switch cam, the result will be that the needle will move slightly to the left to enter the goods at the point $d$. At the next thrust of the needle the barring cam does not give the needle any lateral movement, but the switch cam moves it to the left, thus causing it to enter the goods at the point $a$ again and at the next thrust both the barring cam and switch cam give the needle a movement to the right causing it to enter the goods at the point $b$ again.

The above description applies also if the barring cam comes into action at the time that the needle is making one thrust 22 at the edge of the buttonhole. In this case looking at the top of Fig. 18 if it be assumed that the barring begins when the needle is making the thrust at the point $d$, then at the next thrust of the needle the switch cam will tend to move the needle to the left while the barring cam will tend to move it to the right, but as the barring cam gives the needle a greater movement, the result will be that the needle will enter the goods at the point $c$. At the next thrust of the needle the barring cam has no action in moving the needle laterally, but the switch cam moves it to the right, thus causing the needle to enter the goods at the point $b$. At the next thrust both the switch cam and the barring cam come into action, thus moving the needle laterally to the left and causing it to enter the goods at the point $a$ which makes the long stitch. At the next thrust the barring cam has no action, but the switch cam will move the needle to the right, thus causing it to enter the goods at the point $d$ again, after which the above cycle of operations will be repeated.

It will thus be seen that both long and short stitches will be formed in making the barring at the end of the buttonhole, regardless of whether the barring stitches start from the point $a$ or from the point $d$.

The means I have herein provided for operating the cam element 25 from the driving shaft 24 is such as to give said cam element a comparatively slow intermittent forward movement during the feeding of the work for the formation of the edge stitches of the buttonhole, and then a more rapid movement while the barring stitches are being formed at the end of the buttonhole. This more rapid movement will preferably be a continuous movement, although it might be intermittent without departing from the invention. The reason for driving the cam element 25 with a more rapid movement during the barring stitches is that it permits the barring cam to be made with easier curves. The intermittent movement during the feeding of the buttonhole is desirable so that the work may remain at rest while the needle is penetrating the work. To thus give the cam element 25 the comparatively slow intermittent turning movement and the comparatively rapid continuous turning movement, I provide two operating mechanisms, both actuated from the driving shaft but operating alternately to give rotative movement to the cam 25.

Figure 10:
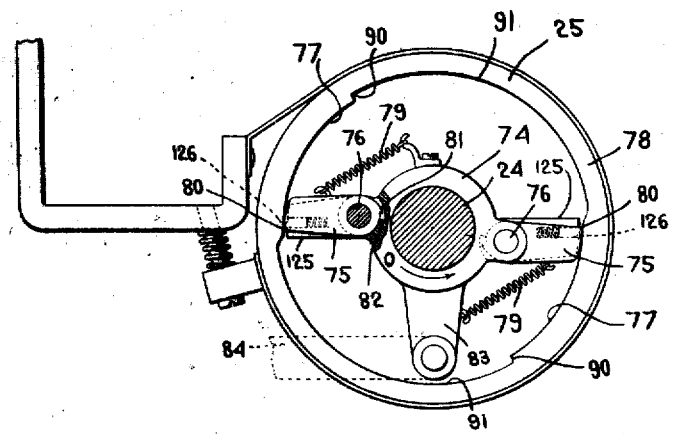
Fig. 10 is a section on the line 10—10, Fig. 8.

The mechanism herein shown for giving the cam element 25 its intermittent or step-by-step rotative movement for intermittently feeding the work is best illustrated in Figs. 8, 9 and 10. The shaft 24 has loosely mounted thereon a sleeve 74 which has pivotally connected thereto at 76 two friction feed dogs 75 that are adapted to engage the raised portions 77 formed on the interior of a flange 78 extending from the end of the cam element 25. Each pivotal point 76 is situated at one side of a radial line extending from the center of the shaft 24 to the point 80 of the feed dog 75 so that when the sleeve 74 is turned in the direction of the arrow $o$, Fig. 10, the feed dogs will be forced outwardly into gripping engagement with the portion 77 of the flange 78. When the sleeve 74 is turned in the opposite direction the gripping engagement will be released and the feed dogs will slide backwardly on the portion 77. An oscillatory movement of the sleeve 74, therefore, will operate to feed the cam element 25 forwardly with an intermittent movement, much the same as would result from an ordinary pawl and ratchet. 79 are springs which act on the dogs 75 and hold them yieldingly in engagement with the surface 77. Each dog is provided with a projection or lip 81 adapted to engage a stop shoulder 82 formed in the sleeve 74, thus limiting the movement of the dog in one direction. For oscillating the sleeve 74, the latter is provided with an arm 83 which is connected by a link 84 to an arm 840 extending from an eccentric strap 85 that surrounds an eccentric 86 carried by a gear 87 that is journaled in suitable bearings 88 carried by the frame. This gear 87 meshes with and is driven by a pinion 89 which is fast to the shaft 24. The link 84 and arm 840 are pivotally connected to a link 841 that is pivoted at 842 to the frame. The rotation of the shaft 24 will thus rotate the eccentric 86 and the latter will give movement to the eccentric strap 85 and its arm 840. The construction of the parts is such that when the eccentric is in its midway position, Fig. 9, the link 84 and arm 841 will be in line with other. As the gear 87 turns through a quarter revolution, the pivotal point 843 between the links 84 and 841 will be moved laterally, thereby moving the arm 83 to the right, Fig. 9, and during the next quarter revolution, the parts will be brought back to the position shown in Fig. 9. During the third quarter revolution, the pivotal point 843 will be moved laterally in the opposite direction, thus again giving feeding movement to the cam element 25, while during the fourth quarter revolution, the parts will be restored to the position shown in Fig. 9. The sleeve 74 is thus given two oscillations during each rotation of the gear 87 and the gear 87 is made twice the size of the gear 89 so as to bring the parts into proper timed relation.

From the above it will be seen that the sleeve 74 is given an oscillating movement in timed relation with the rotation of the shaft 24, and this oscillating movement operates through the feed dogs 75 to give the cam element 25 the intermittent forward feeding movement so long as the feed dogs 75 are in engagement with the raised portion 77. When, however, the cam has been fed forward to such a point that the feed dogs pass off from the shoulders 90 at the end of the raised portion 77, then said dogs become inoperative because the low portions 91 of the flange 78 are formed on such a radius that the feed dogs will not engage therewith. At the time that the feed dogs pass off from the raised portion 77 and thus become inoperative, then the other cam-actuating mechanism comes into operation by which the cam element 25 is given a continuous forward rotation at a comparatively rapid rate. When said other mechanism, which will be presently described, becomes operative to give the cam element 25 its rapid forward movement for the barring operation, it is necessary that the cam should be so positioned that the barring cam groove 71 will act to give the needle the lateral movement at the time that the needle is elevated and withdrawn from the work, and to secure this end I have provided means coöperating with the feed dogs 75 to positively place the cam element 25 in such a position relative to the stitch-operating mechanism that when the barring stitches are formed the barring cam will operate to give the needle the desired lateral movement when the needle is withdrawn from the work. This mechanism comprises two spring-pressed pawls 126 carried by arms 125 extending from the sleeve 74 which pawls are adapted to coöperate with the square shoulders 90 formed at the ends of the raised portion 77. When the last edge stitch on the buttonhole is being formed, the feed dogs 75 are about to pass off from the raised portion 77 of the flange 78, and during the next backward movement of the dogs they will be carried off from the shoulders 90. As they pass off from the shoulders 90, the spring-pressed pawls 126 will be thrown outwardly by their springs so that upon the next forward movement they will come into contact with the shoulders 90 and will positively move the cam element forward to a definite position, thus bringing said element into the proper timed relation with the stitch-forming mechanism so that upon the beginning of the barring operation the barring cam will operate to move the needle laterally at the time that it is raised from the goods.

Figure 11:
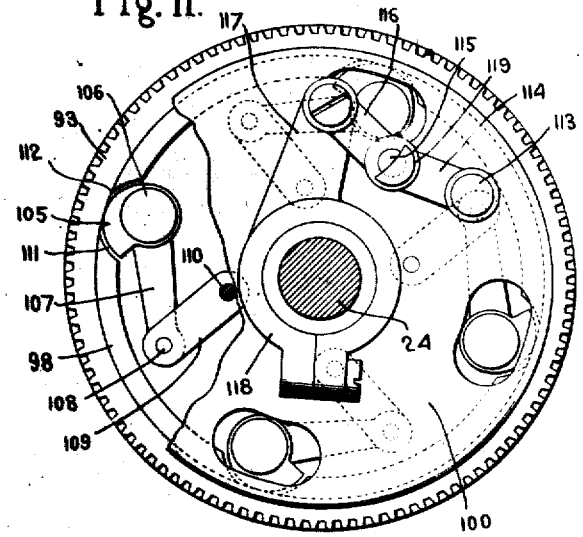
Fig. 11 is a section on the line 11—11, Fig. 8.
Figure 12:
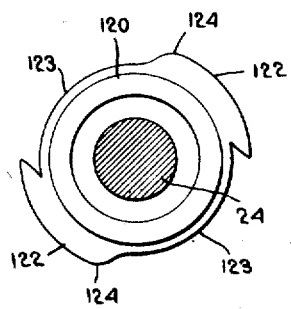
Fig. 12 is a detail of the clutch-controlling cam.

The cam element 25 is given its continuous forward rotation at a comparatively rapid rate by the following device:

The cam element 25 is provided at the end opposite the flange 78 with a flange 92 on which is loosely mounted a ring gear 93 that is continuously driven from the shaft 24, and means are provided for clutching said gear to the cam element 25 at the times when the feed dogs become inoperative, and for unclutching said gear from the cam element when said cam element has been turned far enough so that the feed dogs become operative again. This ring gear 93 meshes with and is driven by a pinion 94 on a countershaft 95 that is journaled in a suitable bracket 96 depending from the base plate. The shaft 94 has thereon a large gear 97 which meshes with and is driven by a pinion 98 fast on the shaft 24. The shaft 24 will be driven at a comparatively high rate of speed and the gearing 98, 97, 94, by which the ring gear 93 is driven, is in the nature of reducing gears, so that the ring 93 will be driven at a much slower speed than the driving shaft 24. The cam element 25 is provided with a hub 99, see Fig. 8, on which is loosely mounted a clutch plate 100 having a hub 101 that encircles the hub 99. This clutch plate is yieldingly connected to the cam element 25 through a spring 102 which encircles the hub 101, and one end of which is connected to the cam element at 103, and the other end of which is connected to the hub 101 at 104. The flange 92 of the cam element 25 has pivotally connected thereto a plurality of clutch cams 105, each cam being pivotally mounted on a stud 106 extending from the flange 92 and being provided with an arm 107 rigid therewith which is pivotally connected at 108 to a link 109 that in turn is connected at 110 to the disk 100, as seen in Fig. 11. The clutch cams 105 operate in openings 111 formed in the flange 92 and are adapted to have clutching engagement with the interior face 112 of the ring gear 93 thereby to clutch said gear to the cam element 25. Upon referring to Fig. 11, it will be seen that if the clutch disk 100 turns clockwise relative to the cam element 25, such relative turning movement will act through the links 109 and arms 107 to separate the clutch elements 105 from the interior face 112 of the ring gear, while if the clutch disk 100 turns in the opposite direction relative to the cam element 25, then the clutches 105 will be thrown into clutching engagement with the ring gear 93.

I have provided herein means whereby the ring gear is unclutched from the cam element 25 while the cam element is being driven forwardly with an intermittent motion from the clutch dog 75, and whereby said ring gear 93 will be clutched to the cam element at the instant that the cam element 25 has been brought to its predetermined position by the pawls 126 after the feeding dogs 75 pass off from the clutch surfaces 77. This correlation between the operation of driving the cam element 25 by the clutch dogs 75 and by the ring gear 93 is secured by the following devices:

The clutch disk 100 has a link 114 pivotally connected thereto at 113, said link being pivoted at 115 to a second link 116 which is pivoted to the end of an arm 117 rigid with a sleeve 118 that is clamped to the hub 99 of the cam element 25. The links 116 and 114 are provided at their pivotal connection with a projection 119 which is adapted to have engagement with a stationary controlling cam 120 as the clutch disk 100 and shaft 24 rotate. This cam 120 may be mounted on any suitable stationary support and is herein shown as carried by a bearing 121 through which the shaft 24 extends. The cam 120 is provided with two high portions 122 and intermediate low portions 123. The high portions 122 are so constructed and positioned as to be engaged by the projection 119 as the clutch disk 100 rotates. The engagement of the projection 119 with either high portion 122 will tend to straighten the toggle lever 116, 114, thereby turning the disk 100 clockwise, Fig. 11, relative to the cam 25, it being understood that the link 116 is pivoted to the arm 117 that is rigid with the cam, while the link 114 is pivoted to the disk 100. This turning movement of the disk 100 relative to the cam 25 is against the action of the spring 102, and it results in releasing the clutches 105 from the ring gear 93, thus unclutching the ring gear from the cam element 25. As soon, however, as the projection 119 passes off from either high portion 122 of the cam 120, the spring 102 moves the cam disk 100 backwardly relative to the cam element 25, thereby bringing the clutch members 105 into clutching engagement with the ring gear 93 and thus clutching said ring gear to the cam element. The cam 120 is so positioned that the projection 119 will be in engagement with the high portions 122, thus holding the ring gear 93 unclutched from the cam element 25 during the time that the feed dogs 75 are acting on the high portion 77 of the flange 78, and said projection 119 will drop off from the high portion 122 at the instant that the cam 25 has been fed forward by the pawls 126 after the feed dogs 75 have passed off from the high portion 77. It will be noted that the controlling cam 120 has two high portions 122 and two low portions 123 and that the cam element 25 has two high portions 77 and two intermediate low portions 91. When in the operation of the sewing machine the stitching is commenced on one side of the buttonhole, the feed dogs 75 will be in the position shown in Fig. 10 and the projection 119 will be at the front end 124 of one of the high portions 122. As the stitching proceeds the feed dogs 75 will feed the cam element 25 slowly forward with an intermittent motion and the projection 119 will pass over the high portion 122 at the end of the buttonhole. The high portions 77 and 122 are so proportioned relative to the length of the inclined portion 72 of the feed cam groove that the feed dogs 75 will pass off from the high portion 77 and said cam will receive its positive forward movement by the pawls 126 at the same instant that the projection 119 passes off from the high portion 122 and at this instant the roll 27 is at the end of the inclined portions 72 of the feed cam groove. The feeding motion of the work then ceases and at the same instant the ring gear 93 is clutched to the cam element 25 so that the latter is operated with a continuous motion and at a higher speed. While the cam element is thus operated at a higher speed the barring cam 71 operates to effect the barring of the buttonhole and also shifts the carrier 35 to position the needle for stitching down the other side of the buttonhole. By the time the barring stitches have been completed, the cam element 25 has advanced sufficiently to bring the high portion 77 into operative engagement with the feed dog 75 again, and the projection 119 has engaged the other high portion 122, thus unclutching the ring gear 93 from the cam element 25. The cam element 25 is then given an intermittent rotary movement at a comparatively slow speed so as to effect the feeding of the work for the stitching of the other side of the buttonhole and during this time, the barring mechanism is held inactive by the straight portion of the barring cam groove. At the end of the feeding movement of the buttonhole, the projection 119 drops off from the end of the high portion 122 and the feed dogs 75 pass out of engagement with the high portion 77, thus causing the cam element to be clutched to the ring gear 93, and said cam element is then rotated forwardly with a continuous movement at a high rate of speed to effect the barring at the other end of the buttonhole.

The distance between successive stitches on the buttonhole is determined by the extent of the oscillatory movement given to the sleeve 74, and this in turn is determined by the eccentricity of the eccentric 86. I have provided herein novel means for varying the eccentricity of the eccentric 86 so as to provide for any desired spacing of the stitches, and the means I have herein illustrated for this purpose is such that the adjustment of the eccentric can be made while the stitching is being done and without stopping the machine. The eccentric 86 is mounted on the inclined end 127 of a bar 128 which is slidable axially of the gear 87, said bar being non-circular in cross-section, as shown in Fig. 9. Owing to the inclination of the end 127, it will be seen that longitudinal movement of the bar 128 will move the eccentric 86 radially thereby varying the eccentricity thereof. This bar 128 is provided at its end with a grooved collar 129, in the groove of which is received rolls or projections 130 carried by the forked end 131 of a controlling lever 132 that is pivoted to the base plate at 133. By means of this lever, the bar 128 can be shifted longitudinally, thereby varying the eccentricity of the eccentric 86, and this can be done without stopping the machine and while the stitching operation is in progress. The adjusting bar 128 for adjusting the throw of the eccentric 86 is so designed that the desired variation in the throw of the eccentric can be obtained without moving the eccentric out of its proper timed relation to the other parts of the machine. This is accomplished by arranging the inclined portion 127 so that the adjusting movement of the eccentric will be on a radial line extending through the high and the low part of the eccentric, as shown in Fig. 9, wherein the radial dotted line indicates the line on which the eccentric is adjusted. The lever 132 is shown as having a spring-pressed finger piece 134 pivoted thereto, which finger piece carries a friction locking device 135 adapted to engage a friction surface 136 thereby to frictionally hold the lever 132 in adjusted position.

As stated above, the under thread-handling mechanism is in the form of a rotary element 6 hereinafter referred to as a shuttle which rotates in a case or holder 7. The shuttle is given its rotary movement from a shuttle driver 137 which is arcuate in shape and is sustained by a shaft 138 rotatably mounted in a support 139. This shaft 138 is driven from the vertical shaft 44 by means which give the shuttle a variable rotative movement as usual in some sewing machines. The vertical shaft 44 is provided with a bevel gear 140 which meshes with a bevel gear 141 on a horizontal shaft 142 which is situated out of line with the shaft 138. The shafts 142 and 138 are connected by a link connection 143, one end of which is pivoted eccentrically to a disk 144 on the shaft 142, and the other end of which is pivoted eccentrically to a disk 145 on the shaft 138. Owing to the non-axial relation between the shafts 142 and 138, the shaft 138 will be given a variable rotary movement. The shuttle 6 carries the usual bobbin 146 from which the under thread is supplied, and said shuttle is provided with the hook or beak 147, as usual, which enters the loop of needle thread, said shuttle passing through said loop to cause the upper and under threads to be interlocked, as usual in sewing machines of this type. The rotation of the shuttle driver 138 is clockwise, Fig. 3, and the length of the arcuate portion of the shuttle driver is such that when the shuttle engages one end thereof there is a slight space between the shuttle and the other end thereof. When the hook or shuttle is about to enter the loop of needle thread, the shuttle is being driven forward by the engagement of the end 148 of the driver with the shuttle, and there is a slight space between the end 149 of said shuttle driver and the shuttle, so that the loop of needle thread will pass freely between the shuttle driver and the shuttle. The variable motion given to the shaft 138 is such that as the loop of needle thread is being shed from the shuttle, the speed of rotation of the shuttle driver will be reduced, and the shuttle through its momentum will move forward into engagement with the end 149, thus opening a space between the end 148 of the shuttle driver and the shuttle through which the loop of needle thread will freely pass. In order to avoid any possibility that the loop of needle thread will get caught on the end 148 of the shuttle driver as it is being shed from the shuttle, I have provided said shuttle driver with a curved guard finger 150 which guides the needle thread as it is shed from the shuttle.

The under thread mechanism herein shown is constructed so that it can be drawn outwardly to the front end of the base 1 thereby bringing the shuttle carrier into a position where the shuttle can be readily taken out from its casing or replaced therein, and into a position where the bobbin can be easily put in position or removed. To provide for this the shuttle carrier 7 is sustained on the support 139 and the latter is provided with guiding ribs 151, 152 that are slidably mounted in ways 153, 154 formed in the portion 155 of the frame. The shaft 142 is made telescopic and is herein shown as including the sleeve portion 156 into which telescopes a stem portion 157, said stem portion being connected to a shaft section 158 that is journaled in an arm 159 carried on the support 139 and has the disk 144 mounted on the end thereof. The telescopic section 157 is non-circular in cross-section and the sleeve 156 has a non-circular bore, thus providing the necessary driving connection. The telescopic construction permits the support 139 carrying the shuttle to be moved longitudinally without destroying the driving connection. This support 139 is shown as having a handle 1590 by which it may be drawn outwardly toward the front of the machine. The ways 153, 154 extend clear to the end of the base frame so that the support 139 with the shuttle carried thereby can be removed entirely from the machine. The driving shaft for the shuttle is provided with the universal joints 160, 161 so as to allow free action and prevent binding of the parts. The movement of the support 139 inwardly or toward the left Fig. 7 is limited by a stop member 162 which is clamped in position by a set screw 163. 164 is a clamping screw operating in the frame 155 and adapted to engage the lower end of the rib 151, thereby clamping the support 139 in adjusted position. This clamping screw has an arm 165 rigid therewith which is connected by a link 166 to a sliding actuator 167 operating in a suitable guide 168. By moving the actuator out and in, the binding screw 164 can be operated to clamp the support 139 in adjusted position or release it so that it may be adjusted.

240 indicates a take-up lever. This take-up lever is pivoted to the overhanging arm at 241 and is controlled by a cam 242 on the shaft 36. The take-up lever comprises two connected arms 301, 302, each of which has a guide eye 303 in the end thereof. The upper thread $t$ is taken from the source of supply, through a suitable tension 243, and through a guide eye 244, thence through a spring take-up 304 and through a second guide eye 245, and thence through the eye 246 and through the eye 303 in the arm 302 of the take-up lever, thence through a stationary guide eye 247, thence through the guide eye 303 in the other arm 301 of the take-up lever and thence to the needle bar and needle. The action of the cam 242 is designed so as to tighten the thread $t$ and take up slack therein at the proper time in the stitching operation to set the stitch. By making the take-up lever 240 with the two arms 301, 302, the thread $t$ is formed in two bights by the two arms of the take-up lever and, therefore, any upward movement of the take-up lever will take up twice as much thread as if the thread were formed into a single bight by the take-up lever. The advantage of this is that the necessary amount of thread can be taken up by giving the take-up lever a comparatively short stroke.

Provision is also made for cutting the buttonhole, and this may be accomplished either before or after the stitching operation. When comparatively thin cloth is being operated on it is preferable to cut the buttonhole after the buttonhole is stitched, because if it is cut before the stitching, the tension on the thread is liable to pull the threads of the cloth out of position. The buttonhole cutter is shown at 169 and its construction is such that it is operative to cut the buttonhole while the buttonhole is in stitching position. In other words, with my invention it is not necessary to shift the work from the sewing position in order to bring it into position to have the buttonhole cut. The advantage of this is that no time is consumed in transferring the work from a position to have the buttonhole cut to that in which the stitching may be performed, and as a consequence, the complete cycle of operations can be more rapidly performed. To provide for thus cutting the buttonhole when the work is in stitching position the buttonhole cutter is mounted on a holder 170 which is situated in an inclined position and slides in a bearing 171 carried by the overhanging arm 3. When the buttonhole cutter is raised, as shown in Fig. 7, it is entirely out of the way of the stitching mechanism, but when it is depressed, the cutting edge thereof moves down into position to cut the buttonhole, owing to the inclined position. This cutter is actuated by an eccentric 172 mounted on the shaft 24 and operated by means presently to be described. For this purpose, the upper end of the holder 170 is connected by a link 173 to one arm of an elbow lever 174 pivoted to the frame at 175, the other arm of said lever being connected by a link 176 to an arm 177 extending from the eccentric strap 178 that embraces the eccentric 172. The arm 177 and link 176 are also connected to a radius arm or link 179 which in turn is pivoted to the frame at 180. As the eccentric is rotating the arm 177 of the eccentric strap is raised and lowered and this operates through the link 179 to vibrate the link 176 longitudinally thereby acting through the elbow-lever 174 to operate the holder 170.

As stated above, I have provided means herein whereby the buttonhole cutter can be operated either before the stitching operation commences on a buttonhole, or after the stitching operation on said buttonhole is completed. Where the device is arranged to cut the buttonhole after the stitching is completed, I will preferably so arrange the operating mechanism that the buttonhole cutter will be actuated automatically at the proper time in the cycle of operations.

It will be seen from the above that all of the operative parts of the machine are actuated from the driving shaft 24. This shaft is actuated from a driving pulley 181 which is loosely mounted on the shaft, and means are provided for clutching said driving pulley to the shaft to actuate the latter, thereby to effect the stitching operation, and to unclutch said pulley from the shaft automatically when the stitching operations are completed. Means are also provided whereby the eccentric 172 for actuating the buttonhole cutter is operated from the pulley 181 at the time that said pulley is unclutched from the driving shaft 24. The pulley 181 is shown as provided with a flange 182, the interior surface 183 of which constitutes a clutch surface, and this clutch surface coöperates with a friction clutch 184 which is carried by a clutch sleeve 185 slidably mounted on the shaft 24. Said clutch sleeve is shown as provided with a laterally-extending pin 186 on which the clutch 184 is mounted. The clutch 184 is in the nature of a split band and it is clutched to the clutch surface 183 by expanding it. This expansion of the clutch is secured by a clutch-expanding cam 187 rotatably mounted on a pin 188 carried by the sleeve 185. Said cam has a finger 189 extending therefrom which coöperates with a cam 190 formed on the hub 191 of the pulley 181. The pulley 181 is rotating continuously. The clutch sleeve 185 is movable longitudinally of the shaft, and when it is moved inwardly toward the pulley, the clutch finger 189 is brought into the path of the cam 190, and as the pulley rotates, the cam will engage the finger, thereby turning the clutch-expanding cam 187 and expanding the clutch into clutching engagement with the interior clutch surface 183 on the pulley. The pulley will thus become locked to the clutch and drives the clutch sleeve 185. Since the clutch sleeve is splined to the shaft 24, the shaft will be thus driven from the clutch sleeve. The clutch sleeve is actuated by a clutch actuator 192 in the form of a lever pivoted to the frame at 193 and having a forked end 194 which engages pins 296 extending from a ring 195 that loosely encircles the clutch sleeve. It will thus be seen that by shifting the clutch sleeve 185 to the right, Fig. 13, the pulley will be clutched to the shaft 24. To unclutch the pulley from the shaft 24, the sleeve 185 is shifted to the left Fig. 13, thereby to withdraw the finger 189 from the cam 190, and as soon as this is done, the resiliency of the clutch ring 184 will withdraw it from clutching engagement with the surface 183.

Figure 2:
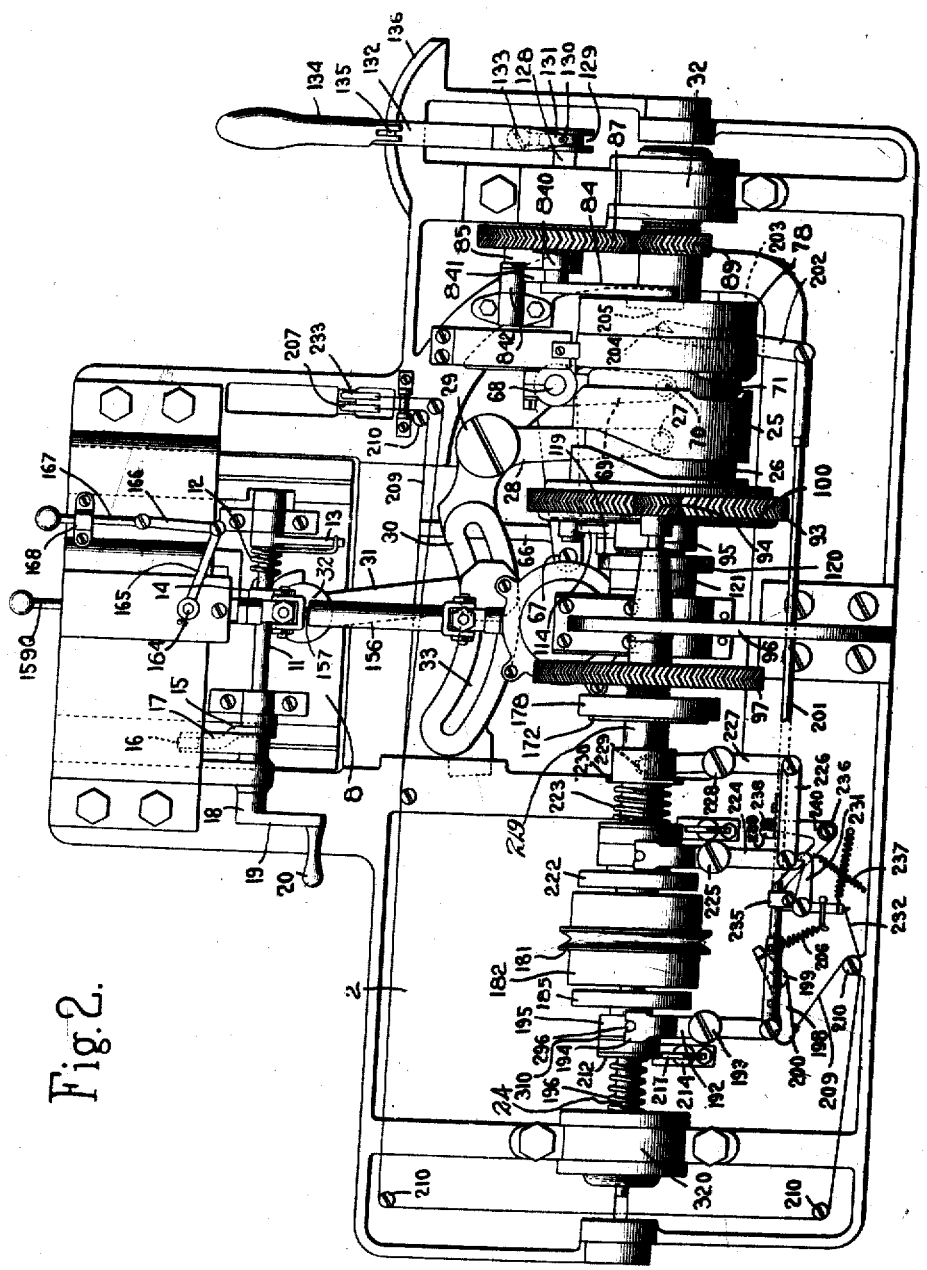
Fig. 2 is an underside plan view.

I have provided herein automatically-operative means for shifting the clutch sleeve 185 into clutch-engaging position, which means is normally held inoperative by a latch so that to start the machine it is only necessary to release the latch and allow the automatically-operative means to throw the clutch into engagement. I have also provided automatically-operative means to positively disengage the clutch at the end of the stitching operation. The automatically-operative means for throwing the clutch into engagement is herein shown in the form of a spring 196 which surrounds the shaft 24 and engages at one end against the bearing 197 for said shaft and at the other end against the sleeve 185. This spring is normally held inoperative by a latch 198 pivoted to the bed plate at 199 and provided with a hook 200 adapted to engage the end of the lever 192, thereby to hold the clutch disengaged, as shown in Fig. 2. This lever 192 has a link 201 connected thereto which is pivoted to a clutch-disengaging lever 202 that in turn is pivoted at 203 to the frame of the machine and is provided with a nose 204 adapted to be engaged by a stop cam 205 mounted on the cam element 25. This stop cam 205 is shown in dotted lines Fig. 2 because it is on the back side of the cam element 25. The direction of rotation of the cam element 25 is such that when the stop cam 205 is in the position shown in Fig. 2, it is moving toward the top of said figure, and in its upward movement, it engages the end 204 of the lever 202, thereby swinging said lever in the position shown in Fig. 2 and operating through the link 201 and clutch actuator 192 to disengage the clutch. The stop cam 205 is so positioned on the cam element 25 that the clutch will be disengaged at the completion of the buttonhole. The latch 198 is acted upon by a spring 206 which operates to throw it into engagement with the lever 192 when the clutch has been disengaged by the stop cam 205 and thus the clutch is locked in its disengaged position. To start the machine again the latch 198 is turned against the spring 206 to release the clutch actuator 192, thereby allowing the spring 196 to throw the clutch into engagement. While any suitable means may be employed for releasing the latch I have shown herein a starting lever 207 pivoted to the bed plate 2 and connected by a flexible connection 209 which passes around suitable friction pulleys 210 to the end of the latch 198 so that depression of the starting lever 207 will release the latch and allow the clutch to be thrown into engagement.

I have provided a stop device for positively bringing the shaft to rest in a predetermined position with the needle raised. The stop device which I have herein illustrated for this purpose is similar in all respects with the stop device which is used for bringing the buttonhole-cutting mechanism to rest at the completion of its operation. This latter stop device is shown in Fig. 15, and since the stop device for the stitch-forming mechanism is identical to that shown in Fig. 15, I have not thought it necessary to illustrate it herein. The construction of the stop device for the stitch-forming mechanism will be readily understood by referring to the stop mechanism for the buttonhole cutter shown in Fig. 15. This stop device comprises a stop lug 211 on a plate 212 secured to the clutch-actuating sleeve 185 and a stop dog 213 which is slidably mounted in a stand 214 carried by the frame and is adapted to be engaged by the lug 211. This stop dog 213 is backed by a spring 215 so that it has a yielding movement. When the clutch is engaged, the clutch-actuating sleeve 185 is moved into a position to carry the stop lug 211 to one side of the stop dog 213, but when the clutch is disengaged then the stop lug 211 is moved so that the stop dog 213 is in the path of movement of the stop lug. The direction of rotation of the shaft is indicated by the arrow b in Fig. 15, and by referring to said figure, it will be seen that when the clutch is disengaged and the clutch actuator is in the position shown in Figs. 2 and 13, the stop lug 211 will be brought into engagement with the stop dog 213, thereby bringing the shaft to rest. Since this stop dog 213 is yieldingly sustained it will yield slightly under the momentum of the parts so as to bring the shaft to rest with a cushion movement, and when the parts have been brought to rest, the expansive action of the spring 215 will return the parts to the position shown in Fig. 15 if the stop lug has overrun at all. In order to prevent any rebound, I have provided herein a dog 217 pivoted at 218 to the standard 214 and acted upon by a spring 216. When the stop lug 211 moves around into engagement with the stop dog 213, it will wipe by the dog 217 and the latter will snap in behind the lug and will thus prevent any rebound after the parts have been brought to rest.

The stop mechanism herein shown is also provided with braking means by which the momentum of the parts is partially overcome between the time that the clutch 184 is released and the stop lug 211 comes into engagement with the stop dog 213. This braking device is in the form of a friction disk 310 which is situated between the ring 195 and a shoulder 311 formed on the clutch sleeve 185. When the clutch is disengaged the ring 195 is carried to the left in Figs. 2 and 13, and by its engagement with the friction disk 310 it moves the clutch sleeve 185 to the left against the action of the spring 196. The ring 195 does not rotate and, therefore, there will be a certain amount of friction developed between the ring, the friction disk 310 and the shoulder 311, the degree of friction depending upon the strength of the spring 196 and the character of the friction disk. This friction applies a braking action upon the shaft 24 and it can be so adjusted that it will materially reduce the speed of the shaft between the time when the clutch is disengaged and the stop lug 211 comes into engagement with the stop dog 213. By this means the mechanism will be brought to rest with an easy movement and without any appreciable noise.

The form of clutch herein illustrated has the advantage that it will be completely engaged in less than one rotation of the shaft 24. When the clutch sleeve 185 is moved to the right, Fig. 13, to render the clutch operative the clutch member 184 will be expanded into clutching engagement with the flange 182 by the operation of the cam 190 on the finger 189. This expanding action of the clutch must necessarily occur while the shaft is making a partial rotation. The shaft will, therefore, be brought up to full speed in less than one rotation of the driving pulley, but the action will be a cushioned or yielding action, such as results from the use of a friction clutch. This is of considerable advantage in a sewing machine because when the machine is set in operation it will be almost instantly brought up to full speed and the first stitch will be formed at full speed, thus insuring the proper tightening of said stitch.

As stated above, the buttonhole cutter 169 is actuated from the driving pulley 181, and the means for operating it may be such as to cause it to operate before the stitching is started or immediately after the stitching has been completed on a buttonhole. It will be remembered that the buttonhole cutter is actuated from an eccentric 172. This eccentric is carried by a sleeve 219 that is loosely mounted on the shaft 24 and is adapted to be clutched to the driving pulley 181 at proper times. For this purpose the driving pulley 181 is provided with the clutch surface 220 and a clutch mechanism 221 similar to that employed for clutching the pulley 181 to the shaft 24 is employed for clutching said pulley to the sleeve 219. This clutch mechanism comprises a clutch-actuating sleeve 222 similar to the clutch sleeve 185 and splined to the sleeve 219 and acted upon by a spring 223, which normally tends to throw the clutch into engagement. The clutch is disengaged by means of a clutch-actuating lever 224 similar to the lever 192 and pivoted to the frame at 225. This lever 224 is connected by a link 226 to a controlling lever 227 pivoted to the frame at 228 and having at its end a roll 229 adapted to be engaged by a stop cam 230 rigid with the sleeve 219. The lever 224 is acted upon by a latch 231 which normally holds the clutch 221 disengaged, and this latch is connected by a flexible connection 232 to a controlling lever 233 similar to the starting lever 207. When the controlling lever is depressed, the latch 231 is released thereby allowing the spring 223 to throw the clutch 221 into engagement, and when this occurs the sleeve 219 will be rotated from the driving pulley thereby actuating the buttonhole cutter. As the sleeve completes one rotation the stop cam 230 engages the roll 229 and operates the controlling lever 227 to disengage the clutch 221.

I have provided herein means whereby the clutch 221 for operating the buttonhole cutter is automatically engaged at the time that the clutch 184 for driving the shaft 24 is disengaged, so that as soon as the stitching operation is ended the buttonhole will be automatically cut. This is herein provided for by providing the latch 231 with a pointed nose 234 and by providing a resilient arm 235 which is secured to the link 201, said arm 235 being so constructed that when the link 201 is moved to the left, Fig. 2, at the time that the clutch 184 is thrown into clutching engagement, said arm will wipe over the nose 234 while when the link 201 moves to the right, Fig. 2, as it does when the stop cam 205 becomes operative to disengage the clutch 184, said arm will engage the flat side of the nose 234 and thereby swing the latch 231 downwardly so as to release it from the lever 224. When this occurs, the spring 223 will operate to throw the clutch 221 into engagement, thus setting the buttonhole cutter in operation.

240 is an elbow-lever pivoted to the frame at 236, said lever carrying a roll 238 adapted to engage a block 239 which is carried by the link 226. This lever is acted upon by a pulling spring 237. The purpose of this lever is to disengage the finger 235 from the nose 234 as the clutch 221 is being engaged so as to permit the latch 231 to become operative automatically when the clutch 221 is disengaged again at the end of the buttonhole-cutting operation. When the stop cam 205 actuates the lever 202 and moves the link 201 to the right, Fig. 2, thereby to disengage the clutch 184, the resilient finger 235 acts against the nose 234 as above described to release the latch 231 from the lever 224, and at this time the resilient arm is carried over the end 241 of the lever 240. As soon as the latch 231 is released and the clutch 221 is engaged the movement of the link 226 to the right due to the engagement of the clutch 221 will cause the block 239 to engage the roll 238 and turn the lever 240 clockwise about its pivot 236. This movement of the lever 240 brings the end 241 thereof against the resilient arm 235 and raises said arm out of engagement with the nose 234, thus allowing the latch 231 to resume its operative position. When, therefore, the buttonhole has been cut and the clutch 221 has been disengaged again, the latch 231 will be operative to hold the clutch 221 disengaged until the time comes for cutting the next buttonhole in the succeeding cycle of operations. When the clutch 221 has thus become disengaged after the buttonhole has been cut, the sleeve 219 is brought to rest in a predetermined position by the stop device shown in Fig. 15 and in a manner above described with reference to the stopping of the stitch-forming mechanism.

It will be noted that in the machine illustrated in the drawings means for driving the stitch-forming mechanism and for operating the cutter are co-axially arranged, both of these elements being driven from the driving pulley 181. The shaft 24 is journaled in bearings 320 carried by the underside of the base plate 2, and the base plate is pivotally mounted upon the frame 1 so that it can be swung back to give access to the parts underneath. I propose to make the pivotal connection between the frame 1 and the base plate 2 co-axial with the shaft 24 so that the swinging movement of the base plate 2 will be about the axis of the shaft 24. This construction has the advantage that the base plate 2 can be tipped up to expose the parts underneath it without disconnecting the driving belt from the driving pulley 181. Since the driving shaft 24 and all of the operative parts driven thereby are secured to the base plate 2, these parts are rendered readily accessible by simply tipping the base plate 2 up about its pivot. The advantage of making the driving devices for the stitch-forming mechanism and for the buttonhole-cutting mechanism co-axial with each other and all carried by the shaft 24 is that said shaft with the cams and clutches mounted thereon can be readily removed from the base plate for repair if such action is necessary.

While I have illustrated herein a selected embodiment of my invention, I do not wish to be limited to the constructional features shown.

I claim:

1. In a sewing machine, the combination with a reciprocating needle bar and means to reciprocate it, of a needle bar carrier by which said needle bar is guided in its reciprocation, means to vibrate said carrier in timed relation wth the reciprocation of the needle bar, and other means to give said carrier a bodily movement in addition to its vibratory movement and in the direction of the movement of the needle bar due to said vibratory movement.

2. In a sewing machine, the combination with a reciprocating needle bar and means to reciprocate it, of a needle bar carrier by which said needle bar is guided in its reciprocation, means to vibrate said carrier in timed relation with the reciprocation of the needle bar and means to give said carrier periodically a bodily movement in addition to its vibratory movement and in the direction of the movement of the needle bar due to said vibratory movement.

3. In a sewing machine, the combination with an oscillatory needle bar carrier, of a needle bar reciprocably carried thereby, needle-bar-reciprocating mechanism, means to oscillate the needle bar carrier through an arc of predetermined length, and means to give said carrier a bodily vibratory movement in addition to its oscillatory movement and in the direction of the movement of the needle bar due to said oscillatory movement of the carrier.

4. In a sewing machine, the combination with an oscillatory needle bar carrier, of a needle bar reciprocably carried thereby, needle-bar-reciprocating mechanism, means to oscillate the needle bar carrier through an arc of predetermined length, and means to give said carrier periodically a bodily vibrating movement in addition to its oscillatory movement and in the direction of the movement of the needle bar due to said oscillatory movement of the carrier.

5. In a buttonhole sewing machine, the combination with work-holding means, of stitch-forming mechanism including a reciprocating needle bar, a needle bar carrier in which the needle bar reciprocates, means to give the needle bar carrier a vibratory movement of fixed length to effect the formation of edge stitches, means to produce a relative movement between the work-holding means and stitch-forming mechanism as the edge stitches are made, and means to give the needle bar carrier a bodily movement periodically in addition to its vibratory movement and in the direction of the movement of the needle bar due to said vibratory movement of the carrier.

6. In a buttonhole sewing machine, the combination with work-holding means, of stitch-forming mechanism including a reciprocating needle bar, a needle bar carrier in which the needle bar reciprocates, means to give the needle bar carrier a vibratory movement of fixed length to effect the formation of edge stitches, means to produce a relative movement between the work-holding means and stitch-forming mechanism as the edge stitches are made, and means operating automatically when the edge stitches along either side of the buttonhole are completed to give the needle bar carrier a bodily movement in addition to its vibratory movement and in the direction of the movement of the needle bar due to said vibratory movement of the carrier.

7. In a buttonhole sewing machine, the combination with work-holding means, of stitch-forming mechanism including a reciprocating needle bar, a needle bar carrier in which the needle bar reciprocates, means to give the needle bar carrier a vibratory movement of fixed length to effect the formation of edge stitches, means to produce a relative feeding movement between the work-holding means and stitch-forming mechanism as the edge stitches are made, and means operating automatically when the edge stitches along either side of the buttonhole are completed to shift the needle bar carrier bodily in a direction transverse to the feeding movement thereby to place the needle in position to form the stitches at the other side of the buttonhole.

8. In a buttonhole sewing machine, the combination with work-holding means, of stitch-forming mechanism including a reciprocating needle bar, a needle bar carrier in which said needle bar reciprocates, means to oscillate the needle bar carrier in timed relation with the reciprocation thereof to effect the formation of the edge stitches of the buttonhole, means to produce a relative feeding movement between the work-holding means and stitch-forming mechanism as the edge stitches are formed, and means operating automatically when the edge stitches along either side of the buttonhole are completed to move the needle bar carrier bodily in a direction transverse to the feeding movement thereby to place the needle in position to form the edge stitches at the other side of the buttonhole.

9. In a buttonhole sewing machine, the combination with work-holding means, of stitch-forming mechanism including a reciprocating needle bar, an oscillatory needle bar carrier in which the needle bar reciprocates, means to oscillate said needle bar carrier, means to give the work-holding means a feeding movement thereby to form the edge stitches along the sides of the buttonhole, and means to move the needle bar carrier bodily in a direction transverse to the direction of the feeding movement when the side stitching along either side of the buttonhole is completed thereby to place the needle in position for the formation of stitches on the other side of the buttonhole.

10. In a buttonhole sewing machine, the combination with under thread-handling mechanism, of upper thread-handling mechanism including a reciprocating needle bar, a vibratable carrier in which said needle bar is mounted for reciprocating movement, means to give said carrier a vibrating movement of a fixed length to effect the formation of the edge stitches of the buttonhole, and other means entirely separate from the last-named means and operative periodically to give said carrier an additional vibrating movement to effect the formation of barring stitches.

11. In a buttonhole sewing machine, the combination with work-holding means, of stitch-forming mechanism including a reciprocating needle bar and its needle, a needle bar carrier in which said needle bar reciprocates, means to give said needle bar carrier a vibratory movement of a fixed length to effect the formation of edge stitches, means to produce a relative movement between the work-holding means and the stitch-forming mechanism as the edge stitches are formed, and other means entirely separated from the last-named means and operating automatically when the edge stitches along either side of the buttonhole are completed to give the needle bar carrier an additional vibratory movement in the direction of the first-named vibratory movement, thereby to form barring stitches and to place the needle in position for the formation of edge stitches on the other side of the buttonhole.

12. In a buttonhole sewing machine, the combination with work-holding means, of stitch-forming mechanism including a reciprocating needle bar, a vibratable needle bar carrier, means to produce a relative feeding movement between the work-holding means and stitch-forming mechanism, and two independent means for giving to said needle bar carrier a vibratory movement in the same direction.

13. In a buttonhole sewing machine, the combination with work-holding means, of stitch-forming mechanism including a reciprocating needle bar, a vibratable needle bar carrier, means to produce a relative feeding movement between the work-holding means and stitch-forming mechanism, and two independently operating means for giving to said needle bar carrier a vibratory movement in the same direction, one of which operates periodically at the end of each feeding movement.

14. In a buttonhole sewing machine, the combination with work-holding means, of stitch-forming mechanism including a reciprocating needle bar, a needle bar carrier in which said needle bar reciprocates, means to produce a relative feeding movement between the work-holding means and stitch-forming mechanism, means operating simultaneously with the stitch-forming mechanism to give the needle bar carrier a vibratory movement, and other means separate from the last named means and acting periodically to give the needle bar carrier an additional vibratory movement in the same direction as the first-named vibratory movement.

15. In a buttonhole sewing machine, the combination with work-holding means, of stitch-forming mechanism including a reciprocating needle bar and means for reciprocating it, an oscillatory needle bar carrier, means operating simultaneously with the stitch-forming mechanism to oscillate the needle bar carrier to effect the formation of edge stitches, and other means acting periodically at each end of the buttonhole to give the needle bar carrier a bodily movement in the same direction as its oscillatory movement to effect the formation of barring stitches.

16. In a buttonhole sewing machine, the combination with work-holding means, of stitch-forming mechanism including a reciprocating needle bar, and means to reciprocate it, a needle bar carrier, means to give the work-holding means a feeding movement, means to vibrate the needle bar carrier thereby to form edge stitches, and other means operative when the edge stitches on either side of the buttonhole are completed to give said carrier a bodily movement in a direction transverse to the direction of feed thereby to effect the formation of barring stitches.

17. In a buttonhole sewing machine, the combination with work-holding means, of stitch-forming mechanism including a reciprocating needle bar and means to reciprocate it, an oscillatory needle bar carrier, means to give the work-holding means a feeding movement, means to oscillate the needle bar carrier thereby to form edge stitches, and means operative when the edge stitches on either side of the buttonhole are completed to move said needle bar carrier bodily in a direction transverse to the direction of the feeding movement thereby to form barring stitches.

18. In a sewing machine, the combination with a reciprocating needle bar and means to reciprocate it, of a carrier by which said needle bar is guided in its reciprocation, adjustable means to oscillate said carrier in timed relation with the reciprocation of the needle bar, and other means operative only at predetermined periods in the cycle of operations to give said carrier a bodily vibrating movement in the direction of and in addition to its oscillatory movement.

19. In a sewing machine, the combination with a reciprocating needle bar and means to reciprocate it, of a carrier by which said needle bar is guided in its reciprocation, adjustable means to oscillate said carrier in timed relation with the reciprocation of the needle bar, and other adjustable means to give the needle bar carrier periodically a bodily movement in the same direction as and in addition to its vibratory movement.

20. In a sewing machine, the combination with work-holding means, of stitch-forming mechanism including a reciprocating needle bar, means to cause the work-holding means and stitch-forming mechanism to have a relative feeding movement, a swinging needle bar carrier in which the needle bar is mounted for reciprocation, supporting means for said carrier, means to oscillate said carrier relative to its supporting means, and means to move the supporting means bodily in a direction transverse to said feeding movement.

21. In a sewing machine, the combination with a reciprocating needle bar, of a swinging needle bar carrier in which the needle bar is mounted for reciprocation, supporting means for said carrier, means to oscillate said carrier relative to its supporting means, and means to move the supporting means bodily periodically during and in the direction of the oscillation of said carrier.

22. In a sewing machine, the combination with a reciprocating needle bar and means to reciprocate it, of a needle bar carrier by which said needle bar is guided in its reciprocation, means to vibrate said carrier in timed relation with the reciprocation of the needle bar, and other means to give said carrier a bodily movement during the vibratory movement of the needle bar carrier and in the direction of said vibratory movement.

23. In a sewing machine, the combination with a reciprocating needle bar, of an oscillatory needle bar carrier having rigid therewith a laterally-projecting slotted arm, a cam-actuated member having a fixed vibratory movement, and a stud secured to said member and adjustable in said slot, said slot extending in a direction at right angles to the movement of said cam-actuated member.

24. In a sewing machine, the combination with a frame, of two blocks slidably sustained thereby, a needle bar carrier pivotally sustained by said blocks, a needle bar mounted in said carrier, means to oscillate the carrier in timed relation with the reciprocation of the needle bar, and means to move said blocks in said frame in the direction of the oscillatory movement of the needle thereby to give said needle bar carrier an additional movement.

25. In a sewing machine, the combination with a frame, of work-holding means sustained thereby, means to give said work-holding means a feeding movement, two blocks slidably sustained by the frame for movement transverse to the direction of feeding movement, a needle bar carrier pivotally sustained by said blocks, a needle bar mounted in said carrier for reciprocating movement, means to oscillate said carrier in timed relation with the reciprocation of the needle bar, and means to move said blocks periodically thereby to give the needle bar carrier an additional movement.

26. In a sewing machine, the combination with stitch-forming mechanism, of work-holding means, a cam for giving the work-holding means its feeding movement, cam-operating mechanism including an eccentric, and means operable while the stitch-forming mechanism is in operation to adjust the eccentricity of the eccentric thereby to vary the speed of the feeding movement of the work-holding means.

27. In a sewing machine, the combination with stitch-forming mechanism, of work-holding means, a cam for giving the work-holding means its feeding movement, cam-operating mechanism including a feed dog and an eccentric for operating it, and means for varying the eccentricity of the eccentric thereby to vary the speed of feeding movement.

28. In a sewing machine, the combination with stitch-forming mechanism, of work-holding means, a cam for giving the work-holding means its feeding movement, cam-operating mechanism including a feed dog and an eccentric for operating it, and means operative while the machine is in operation for varying the eccentricity of the eccentric thereby to vary the speed of feeding movement.

29. In a sewing machine, the combination with stitch-forming mechanism, of work-holding means, a cam for giving feeding movement to the work-holding means, a driving gear, an eccentric carried by and rotating with said gear, and cam-operating feed dogs actuated by said eccentric.

30. In a sewing machine, the combination with stitch-forming mechanism, of work-holding means, a cam for giving feeding movement to the work-holding means, a driving gear, an eccentric carried by said gear, cam-operating feed dogs actuated by said eccentric, and means operable to adjust the eccentricity of the eccentric while the machine is in operation.

31. In a sewing machine, the combination with stitch-forming mechanism, of work-holding means, a cam for giving feeding movement to the work-holding means, a driving gear, an eccentric-supporting member extending axially through the driving gear and having an inclined portion, an eccentric on said inclined portion, and cam-operating feed dogs actuated by said eccentric.

32. In a sewing machine, the combination with stitch-forming mechanism, of work-holding means, a cam for giving feeding movement to the work-holding means, a driving gear, an eccentric-actuating member slidable axially through the gear and having an inclined portion, an eccentric mounted on said inclined portion, cam-operating feed dogs actuated by said eccentric, and means for adjusting said member axially of the gear thereby to vary the eccentricity of the eccentric.

33. In a device of the class described, the combination with a driving gear, of an eccentric-actuating member slidable axially therethrough and having an inclined portion, an eccentric mounted on said inclined portion, a feed cam, cam-operating dogs actuated by said eccentric, and means to move said member axially of the driving gear thereby to vary the eccentricity of the eccentric.

34. In a sewing machine, the combination with stitch-forming mechanism, of work-holding means, a combined feeding and barring cam, means actuated thereby to give a relative feeding movement between the work-holding means and stitch-forming mechanism and effect the formation of edge stitches and barring stitches alternately, and means for actuating said cam at one rate of speed while it is giving said feeding movement and at another rate of speed while barring stitches are being formed.

35. In a sewing machine, the combination with stitch-forming mechanism, of work-holding means, a rotary cam element, means actuated thereby during a part of each revolution thereof to give the work-holding means and stitch-forming mechanism a relative feeding movement, means actuated thereby during another part of each revolution to effect the formation of barring stitches, and means for rotating said cam at one speed during such feeding movement and at another speed while the barring stitches are being formed.

36. In a sewing machine, the combination with stitch-forming mechanism, of work-holding means, a combined feeding and barring cam, means actuated thereby to give feeding movement to the work-holding means and to effect the formation of barring stitches alternately, a driving shaft, and means for operating said cam from said driving shaft at one rate of speed during the feeding movement and at another rate of speed while the barring stitches are being formed.

37. In a sewing machine, the combination with stitch-forming mechanism, of work-holding means, a combined feeding and barring cam, means actuated thereby to give feeding movement to the work-holding means and effect the formation of barring stitches alternately, and means for actuating said cam at a relatively slow rate of speed while it is giving feeding movement to the work-holding means and at a relatively faster rate of speed while the barring stitches are being formed.

38. In a sewing machine, the combination with a stitch-forming mechanism, of work-holding means, a combined feeding and barring cam, means actuated thereby to give feeding movement to the work-holding means and to effect the formation of barring stitches alternately, and actuating means for said cam operating to give it a slow intermittent movement while the work is being fed and a more rapid continuous movement while the barring stitches are being formed.

39. In a sewing machine, the combination with stitch-forming mechanism, of work-holding means, a rotary cam element, means actuated thereby during a part of each revolution thereof to give the work-holding means a feeding movement, means also actuated thereby during another part of its revolution to effect the formation of barring stitches, and actuating means for said cam operating to give it a slow intermittent rotary movement while the work is being fed and a more rapid continuous movement while the barring stitches are being formed.

40. In a sewing machine, the combination with stitch-forming mechanism, of work-holding means, a rotary cam element, means actuated thereby during a part of each revolution thereof to give the work-holding means a feeding movement, means also actuated thereby during another part of each revolution to effect the formation of barring stitches, two cam-actuating devices, and means to render one of said devices operative while the work is being fed and the other device operative while the barring stitches are being formed.

41. In a sewing machine, the combination with stitch-forming mechanism, of work-holding means, a rotary cam element, means actuated thereby during a part of each revolution thereof to give the work-holding means a feeding movement, means also actuated thereby during another part of each revolution to effect the formation of barring stitches, a driving shaft, two operative driving connections between said driving shaft and cam element, and means to render one driving connection operative while the work is being fed and the other connection operative while the barring stitches are being formed.

42. In a sewing machine, the combination with stitch-forming mechanism, of work-holding means, a rotary cam element, means actuated thereby during a part of each revolution thereof to give the work-holding means a feeding movement, means also actuated thereby during another part of each revolution to effect the formation of barring stitches, a driving shaft, a driving connection between said driving shaft and cam element by which the cam element is given an intermittent movement, a second driving connection by which said cam element is given a continuous movement, and means automatically to render the first-named driving connection operative while the work is being fed and the second operative while the barring stitches are being formed.

43. In a buttonhole sewing machine, the combination with means to form edge stitches along the sides of a buttonhole, said means including a reciprocating needle and needle-jogging mechanism constructed to give said needle a lateral movement at each thrust thereof, of other means separate from the needle-jogging mechanism but operative simultaneously therewith at the end of a buttonhole to give the needle an additional jogging movement at each alternate thrust of the needle thereby to form barring stitches.

44. In a buttonhole sewing machine, the combination with means to form edge stitches along the sides of a buttonhole, said means including a reciprocating needle and needle-jogging mechanism constructed to give the needle a lateral movement at each thrust thereof, of other means separate from the needle-jogging mechanism but operative simultaneously therewith at the end of a buttonhole to give the needle at each alternate thrust thereof an additional jogging movement of greater amplitude than that given by the needle-jogging mechanism.

45. In a buttonhole sewing machine, the combination with means to form edge stitches along the sides of a buttonhole, said means including a reciprocating needle and needle-jogging mechanism, of other means separate from the needle-jogging mechanism but operative simultaneously therewith at the ends of a buttonhole to give the needle an additional back and forth jogging movement at less frequency than that given by the needle-jogging mechanism thereby to form barring stitches.

46. In a buttonhole sewing machine, the combination with means to form edge stitches along the sides of a buttonhole, said means including a reciprocating needle and needle-jogging mechanism, of other means separate from the needle-jogging mechanism but operative simultaneously therewith at the ends of a buttonhole to give the needle an additional back and forth jogging movement at less frequency but of greater amplitude than that given by the needle-jogging mechanism thereby to form barring stitches.

47. In a buttonhole sewing machine, the combination with means for forming edge stitches along the sides of a buttonhole, said means including a reciprocating needle and needle-jogging mechanism constructed to give the needle a lateral movement at each thrust thereof, of other means separate from the needle-jogging mechanism but operative simultaneously therewith at each end of the buttonhole to give the needle an additional jogging movement at each alternate thrust of the needle thereby to form barring stitches.

48. In a sewing machine, the combination with a reciprocating needle bar and means to reciprocate it, of a needle bar carrier by which said needle bar is guided in its reciprocation, means to vibrate said carrier in timed relation with the reciprocation of the needle bar, and other means to give said carrier a bodily movement in addition to its vibratory movement at each alternate thrust of the needle.

49. In a sewing machine, the combination with an oscillatory needle bar carrier, of a needle bar reciprocably carried thereby, needle-bar-actuating mechanism, means to oscillate the needle bar carrier through an arc of predetermined length, and means to give said carrier periodically a bodily vibratory movement in addition to its oscillatory movement and at alternate thrusts of the needle.

50. In a sewing machine, the combination with an oscillatory needle bar carrier, of a needle bar reciprocably carried thereby, needle-bar-reciprocating mechanism, means to oscillate the needle bar carrier through an arc of predetermined length, and means to give said carrier periodically a bodily vibratory movement in addition to its oscillatory movement but at a slower rate.

51. In a buttonhole sewing machine adapted to form both edge stitches and barring stitches, the combination with stitch-forming mechanism including a reciprocating needle bar and means for reciprocating it, of an oscillatory needle bar carrier, means operating simultaneously with the stitch-forming mechanism to oscillate the needle bar carrier to effect the formation of edge stitches, and other means acting periodically at each end of the buttonhole to give the needle bar carrier a bodily movement at each alternate thrust of the needle, said means coöperating with the needle-bar carrier oscillating mechanism to effect the formation of barring stitches.

52. In a sewing machine, the combination with a reciprocating needle bar, of a swinging needle bar carrier in which the needle bar is mounted for reciprocation, supporting means for the carrier, means to reciprocate the needle bar, means to oscillate said carrier relative to its supporting means in timed relation with the reciprocation of the needle bar, and means operative periodically to move the supporting means bodily at each alternate reciprocation of the needle bar.

53. In a buttonhole sewing machine, the combination with stitch-forming mechanism including a vertically-reciprocating needle and means to vibrate said needle laterally as it reciprocates, of a work-holder, a cam member to give the work-holder a feeding movement as the edge stitches are formed on a buttonhole and also to give the needle an additional lateral movement at each end of the buttonhole thereby to form barring stitches, a friction clutch device to actuate said cam member while the edge stitches are being formed, other means to actuate said cam member while the barring stitches are being formed, and means operative at the commencement of the barring operation to bring said cam member into such correlation with the stitch-forming mechanism that the additional lateral movement of the needle will occur while the latter is withdrawn from the work.

54. In a sewing machine, the combination with stitch-forming mechanism including a needle bar and means for giving the needle bar a lateral vibratory movement, of work-holding means, a rotary cam element, means actuated thereby during a part of each revolution thereof to give the work-holding means a feeding movement, means also actuated thereby during another part of each revolution to give the needle bar an additional lateral movement thereby to effect the formation of barring stitches, and means operative at the commencement of the barring operation to bring said cam element into such correlation with the stitch-forming mechanism that the cam element will give said additional lateral movement to the needle bar when the needle is withdrawn from the work.

55. In a sewing machine, the combination with stitch-forming mechanism, of work-holding means, a cam for giving feeding movement to the work-holding means, a driving gear, an eccentric carried by the driving gear, cam-operating feed dogs actuated by said eccentric, and means for adjusting the eccentricity of said eccentric on a radial line extending through the high and low portions of the eccentric.

56. In a sewing machine, the combination with stitch-forming mechanism, of work-holding means, a cam for giving feeding movement to the work-holding means, feed dogs for actuating the cam, a driving gear, an eccentric actuated thereby and by which the feed dogs are actuated, and means to vary the throw of the eccentric.

57. In a sewing machine, the combination with stitch-forming mechanism, of work-holding means, a rotary cam element, means actuated thereby during a part of each revolution thereof to give the work-holding means and stitch-forming mechanism a relative feeding movement, means actuated thereby during another part of each revolution to effect the formation of barring stitches, means for actuating said cam while it is operating to feed the work, and separate means for operating said cam while the barring stitches are being formed.

58. In a sewing machine, the combination with a base frame, of a bed plate and overhanging arm, stitch-forming mechanism carried thereby, a driving shaft mounted on the underside of the bed plate and extending transversely to the overhanging arm, and means for actuating the stitch-forming mechanism from said driving shaft, a driving pulley on the driving shaft, means for clutching said driving pulley to the driving shaft, and means for pivotally connecting the bed plate to said base frame co-axially with said shaft whereby the bed plate may be turned up about its pivot without disconnecting the belt from the driving pulley.

59. In a sewing machine, the combination with stitch-forming mechanism, of work-holding means, a combined feeding and barring cam, means actuated thereby to give relative feeding movement between the work-holding means and stitch-forming mechanism and also to effect the formation of barring stitches, a friction clutch device for operating said cam while it is acting to feed the work, other means for positively operating the cam during the formation of the barring stitches, and stop mechanism actuated by the movement of said cam while it is being positively driven.

60. In a sewing machine, the combination with a reciprocating needle bar and means to reciprocate it, of a needle-bar carrier by which said needle bar is guided in its reciprocations, means to vibrate said carrier in timed relation with the reciprocation of the needle bar, and means to give said carrier periodically a bodily movement during and in the direction of its vibratory movement.

61. In a sewing machine, the combination with an oscillatory needle-bar carrier, of a needle-bar reciprocably carried thereby, needle-bar-reciprocating mechanism, means to oscillate the needle-bar carrier, and means to give said carrier a bodily vibratory movement during its oscillatory movement and in the direction of the movement of the needle-bar due to said oscillatory movement.

62. In a buttonhole sewing machine, the combination with work-holding means, of stitch-forming mechanism including a reciprocating needle-bar, a needle-bar carrier in which the needle-bar reciprocates, means to give the needle-bar carrier a vibratory movement of fixed length to effect the formation of edge stitches, means to produce a relative feeding movement between the work-holding means and stitch-forming mechanism as the edge stitches are made, and means to give the needle-bar carrier a bodily movement periodically in a direction transverse to the feeding movement.

63. In a buttonhole sewing machine, the combination with work-holding means, of stitch-forming mechanism including a reciprocating needle-bar, a needle-bar carrier in which the needle bar reciprocates, means to give the needle-bar carrier a vibratory movement of fixed length to effect the formation of edge stitches, means to produce a relative feeding movement between the work-holding means and stitch-forming mechanism as the edge stitches are made, and means operating automatically when the edge stitches along either side of the buttonhole are completed to give the needle-bar carrier a bodily movement transverse to the feeding movement thereby to effect the formation of barring stitches.

64. In a buttonhole sewing machine, the combination with work-holding means, of stitch-forming mechanism including a reciprocating needle-bar, a needle-bar carrier in which the needle-bar reciprocates, means to give the needle-bar carrier a vibrating movement continuously while the needle-bar is reciprocating, means to produce a relative movement between the work-holding means and stitch-forming mechanism, and means operated periodically to give the needle-bar carrier a bodily movement in a direction transverse to the feeding movement and during the vibratory movement of the needle-bar carrier.

65. In a buttonhole sewing machine, the combination with work-holding means, of stitch-forming mechanism including a reciprocating needle-bar, a needle-bar carrier in which said needle-bar reciprocates, means to give the needle-bar carrier a vibratory movement continuously while the needle-bar is reciprocating, means to produce a relative feeding movement between the work-holding means and stitch-forming mechanism thereby to produce edge stitches, and means operating automatically when the edge stitches along each side of the buttonhole are completed to give the needle-bar carrier a bodily movement in a direction transverse to the feeding movement and while the needle-bar carrier is vibrating thereby to produce barring stitches.

66. In a buttonhole sewing machine, the combination with work-holding means, of stitch-forming mechanism including a reciprocating needle bar, a vibratory needle-bar carrier, means to produce a relative feeding movement between the work-holding means and stitch-forming mechanism, and two independent means for giving to said needle-bar carrier a vibratory movement in a direction transverse to the feeding movement.

67. In a buttonhole sewing machine, the combination with work-holding means, of stitch-forming mechanism including a reciprocating needle-bar, a vibratory needle-bar carrier, means to produce a relative feeding movement between the work-holding means and stitch-forming mechanism, and two independent means for giving to said needle-bar carrier a vibratory movement in a direction transverse to the feeding movement, one of which operates periodically at the end of each feeding movement.

68. In a buttonhole sewing machine, the combination with work-holding means, of stitch-forming mechanism including a reciprocating needle-bar, a vibratory needle-bar carrier, means to produce a relative feeding movement between the work-holding means and stitch-forming mechanism, and two independent means for giving the said needle-bar carrier a vibratory movement in a direction transverse to the feeding movement, one of which operates continuously while the needle-bar is reciprocating and the other of which operates periodically at the end of each feeding movement.

69. In a sewing machine, the combination with stitch-forming mechanism, of work-holding means, a cam for giving feeding movement to the work-holding means, a rotatable driving element, an eccentric carried thereby, cam-operating feed dogs actuated by said eccentric, and means to adjust the eccentricity of said eccentric on said driving element thereby to vary the speed of feeding movement.

70. In a sewing machine, the combination with stitch-forming mechanism, of work-holding means, a cam for giving feeding movement to the work-holding means, a rotatable driving element, an eccentric-supporting member situated co-axially of the driving element and having a portion inclined relative to said axis, an eccentric on said inclined portion, cam-operating feed dogs operated by said eccentric, and means for adjusting said eccentric on said inclined portion thereby to vary the eccentricity of said eccentric.

In testimony whereof I have signed my name to this specification.

FRANKLIN A. REECE.